（12） United States Patent
Jordan et al.

(10) Patent No.: US 9,889,871 B1
(45) Date of Patent: Feb. 13, 2018

(54) RING APPARATUS AND METHOD FOR LIFTING AN ITEM FOR HOLDING WINDABLE MATERIAL

(71) Applicants: David S. Jordan, Knoxville, TN (US); Michael C. Jordan, Knoxville, TN (US)

(72) Inventors: David S. Jordan, Knoxville, TN (US); Michael C. Jordan, Knoxville, TN (US)

(73) Assignee: iTool Equipment Holding LLC, Oak Ridge, TN (US)

( * ) Notice: Subject to any disclaimer, the term of this patent is extended or adjusted under 35 U.S.C. 154(b) by 0 days.

(21) Appl. No.: 15/330,180

(22) Filed: Aug. 19, 2016

(51) Int. Cl.
*B62B 5/00* (2006.01)
*B65H 75/40* (2006.01)

(52) U.S. Cl.
CPC .......... *B62B 5/0083* (2013.01); *B62B 5/0086* (2013.01); *B62B 5/0089* (2013.01); *B65H 75/403* (2013.01); *B62B 2202/025* (2013.01)

(58) Field of Classification Search
CPC .. B65H 75/146; B65H 75/403; B62B 5/0083; B62B 5/0086; B62B 5/0089; B62B 2202/025
See application file for complete search history.

(56) References Cited

U.S. PATENT DOCUMENTS

| 3,976,260 A | 8/1976 | Ink |
| 9,004,392 B1 | 4/2015 | Bigbee, Jr. et al. |
| 9,409,744 B2 | 8/2016 | Jordan et al. |
| 9,617,112 B1 | 4/2017 | Temblador et al. |
| 2015/0321876 A1 | 11/2015 | Gonzalez et al. |

*Primary Examiner* — William E Dondero
(74) *Attorney, Agent, or Firm* — Michael E. McKee

(57) ABSTRACT

An apparatus and method for lifting a spool of windable material including a barrel and two flanges whose rims engage the floor utilizes a ring having a diameter which is greater than the height of the flanges of the spool desired to be lifted. A strut spans at least a portion of the ring interior, and a carriage assembly which is cooperable with the spool barrel at one end thereof is mounted upon the strut for movement between first and second locations therealong so that by positioning the apparatus alongside one flange of the spool while the carriage assembly is positioned in its first location along the strut, placing the carriage assembly in cooperating relationship with the barrel of the spool, and then effecting the movement of the carriage assembly along the length of the strut to the second location therealong, the one flange of the spool is lifted from the floor.

30 Claims, 13 Drawing Sheets

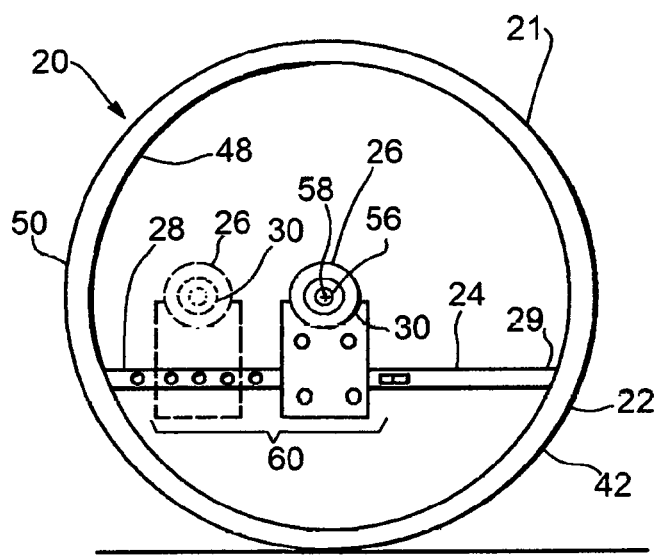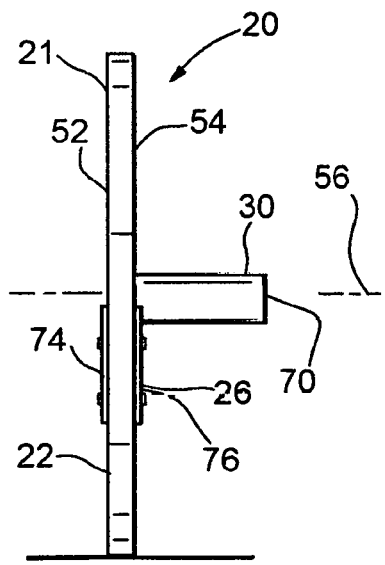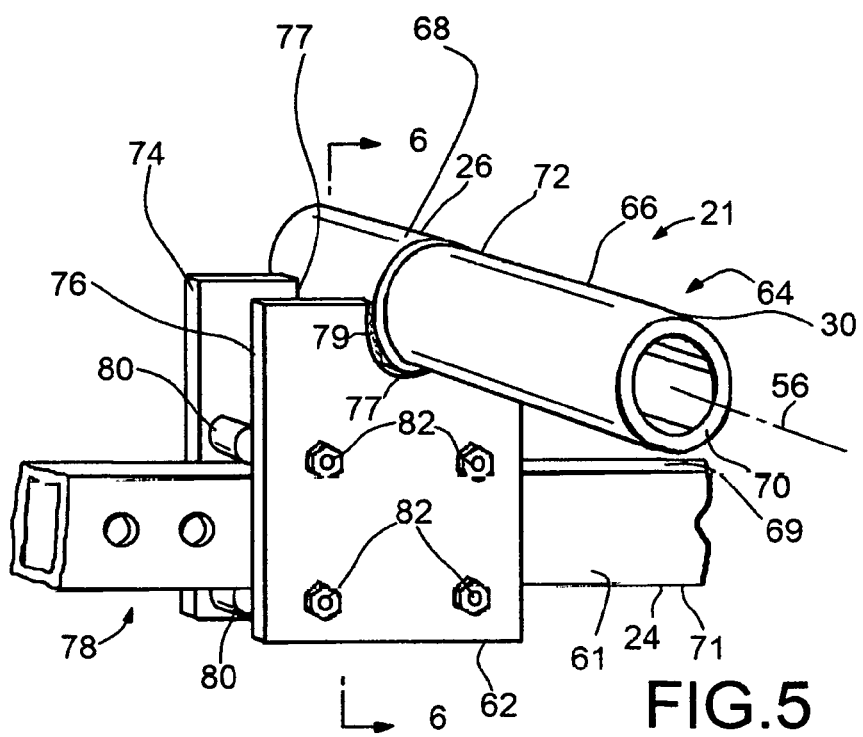

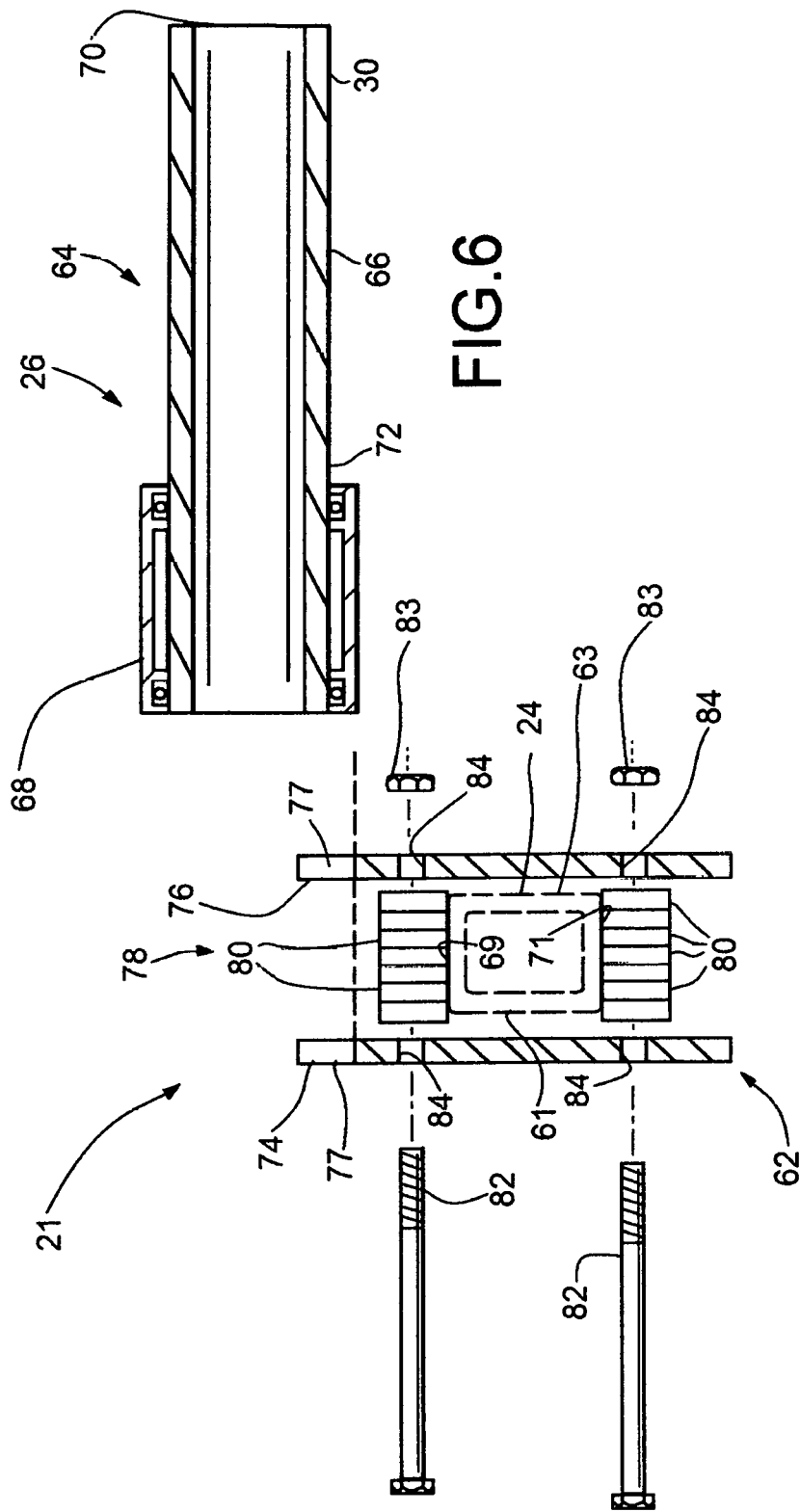

RING APPARATUS AND METHOD FOR LIFTING AN ITEM FOR HOLDING WINDABLE MATERIAL

BACKGROUND OF THE INVENTION

This invention relates generally to means and methods for lifting and transporting an item from one site to another and relates, more particularly, to an accessory and a method of use which is well-suited for lifting an item, such as a spool, for holding windable material from an underlying floor for the purpose of supporting the item above the floor or for transporting the item across the floor.

An item, such as a spool, for holding windable material and which is capable of being lifted and supported by an accessory of the class with which this invention is concerned commonly includes a hollow barrel about which a length of windable material, such as electrical wire or cable, can be wound or from which a windable material can be unwound. In addition and in order for the item to be lifted by an accessory with which this invention is concerned, the item is positioned upon an underlying floor so that the barrel of the item is oriented substantially parallel to the floor.

If an item of the aforementioned class is light enough in weight and possesses circular-shaped flanges at the opposite ends of its barrel, it can be manually rolled across the floor from one site to another as the circular-shaped flanges of the item rollably engage the floor. However, heavier items can be much more difficult to manually roll across the floor. In addition and once such an item has been moved to another site, it must commonly be elevated from the floor and held in such an elevated condition to facilitate the winding of the material from or about the barrel of the item.

It would be desirable to provide a new and improved apparatus for lifting such an item from an underlying floor to an elevated condition and is capable of holding the item in such an elevated condition while material is either unwound from the item or wound about the item.

Accordingly, it is an object of the present invention to provide a new and improved apparatus and method of use for lifting an item of the aforementioned class from a floor to an elevated condition and which is capable of supporting the item in the elevated condition for purposes of winding material about the item or unwinding the material from item.

Another object of the present invention is to provide such an apparatus which facilitates the movement of the item from one site to another as the apparatus, with the item supported thereby, is rolled across the floor.

Another object of the present invention is to provide such an apparatus which is adapted to cooperate with one end of the item for lifting the one end from a floor.

Still another object of the present invention is to provide such an apparatus having a ring which facilitates the movement of the lifted end of the item along the floor as the ring of the apparatus is rolled along the floor.

Yet another object of the present invention is to provide such an apparatus which, when used with an apparatus of like construction, can be used to lift both ends of the item from the floor.

A further object of the present invention is to provide such an apparatus which embodies a jack assembly to facilitate the lifting of one end of the item from the floor.

A still further object of the present invention is to provide such an apparatus which is uncomplicated in structure, yet effective in operation.

SUMMARY OF THE INVENTION

This invention resides in an apparatus and an associated method for lifting an item for holding windable material wherein the item includes an elongated barrel having two opposite ends and about which the material is wound or from which the material can be unwound. The item also includes two flanges which are disposed at the two opposite ends of the barrel, and each of the two flanges has a rim along the periphery thereof. Moreover, the item is arranged so that the rims of both flanges engage an underlying floor, and the barrel of the item is oriented substantially parallel to the floor. In addition, the flanges of the item has a height as measured from the floor.

The apparatus of the invention includes a ring having an outer diameter which is greater than the height of the flanges of the item desired to be lifted with the apparatus and has an interior. The apparatus also includes a strut which is joined to the ring and which includes an elongated section having a length which spans at least a portion of the interior of the ring. In addition, a carriage assembly is mounted upon the elongated section of the strut for movement along the length thereof between first and second locations therealong and which includes a cooperating member which is cooperable with the barrel of the item at one of the two opposite ends of the barrel so that when the item is supported by the apparatus, at least a portion of the weight of the item is borne by the cooperating member of the carriage assembly. When the carriage assembly is positioned at the first location along the elongated section of the strut, the cooperating member of the carriage can be positioned in cooperating relationship with the barrel of the item, and when the carriage assembly is positioned at the second location along the elongated section of the strut and the item is supported at one end of the barrel of the item by way of the cooperating member, the longitudinal axis of the barrel is substantially aligned with the geometric center of the ring. Upon positioning the apparatus adjacent one flange of the item at one of the two opposite ends of the barrel while the carriage assembly is positioned at the first location along the length of the elongated section of the strut, the cooperating member of the carriage assembly can be positioned in cooperating relationship with the barrel of the item. With the cooperating member of the carriage assembly thus positioned in cooperating relationship with the barrel of the item, the movement of the carriage assembly along the length of the carriage assembly to the second location along the elongated section of the strut can be affected so that the rim of the one flange of the item is lifted from the floor.

The method of the invention includes the steps performed when utilizing the apparatus of the invention. More specifically, the apparatus of the invention is provided and then positioned adjacent one flange of the item at one end of the two opposite ends of the barrel. By positioning the cooperating member of the carriage assembly in cooperating relationship with the barrel of the item, and then effecting the movement of the carriage assembly along the length of the elongated section of the strut to the second location therealong, the rim of the one flange of the item is lifted from the floor.

BRIEF DESCRIPTION OF THE DRAWINGS

FIG. 3 is a side elevation view of one of the apparatus supports of FIG. 1.

FIG. 4 is an end elevation view of the FIG. 3 apparatus support as seen from the left in FIG. 3.

FIG. 5 is a perspective view of a fragment of the FIG. 3 apparatus support.

FIG. 6 is a cross-sectional view of the FIG. 5 fragment taken about along line 6-6 of FIG. 5 and shown exploded.

DETAILED DESCRIPTION OF AN ILLUSTRATIVE EMBODIMENT

Figure 1:
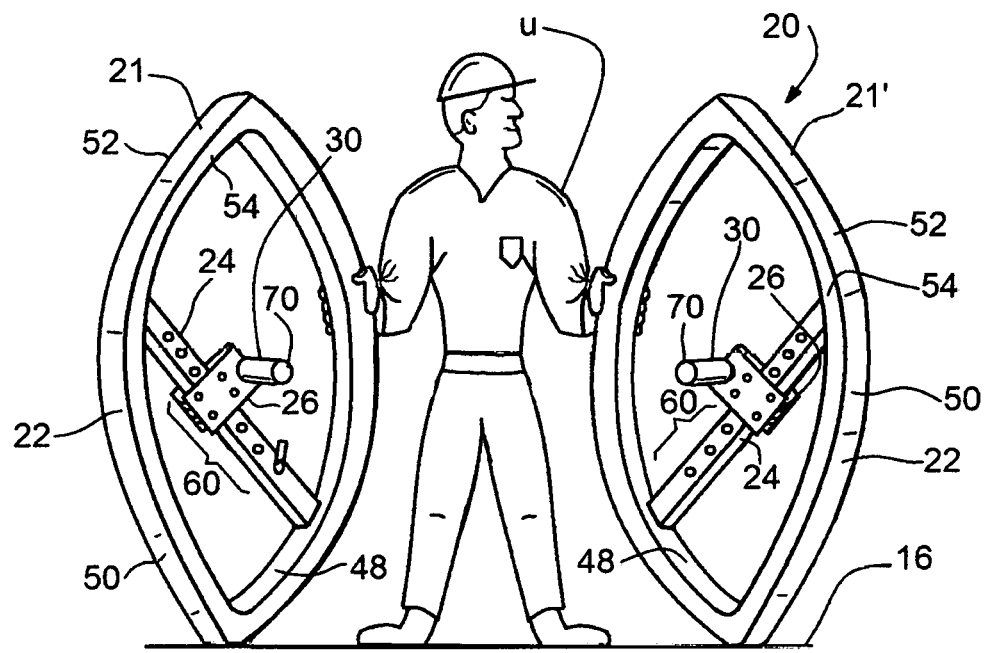
FIG. 1 is a perspective view of a pair of apparatus supports within which features of the present invention are embodied shown held in a substantially vertical orientation by a user.

Turning now to the drawings in greater detail and considering first FIG. 1, there is illustrated an embodiment, generally indicated 20, of an apparatus within which features of the present invention are embodied. The apparatus 20 includes a pair of identical apparatus supports 21, 21' which are positionable on the opposite ends of an item 18 (FIG. 2) and wherein each support 21 or 21' (FIG. 1) includes a ring 22, a strut 24 which extends across the outer ring 22, and a carriage assembly 26 which is mounted upon the strut 24 for movement along the length thereof. In addition, the carriage assembly 26 includes a cooperating member 30 which is cooperable with the FIG. 2 item 18 (at a corresponding end thereof) so that when the cooperating member 30 is positioned in cooperating relationship with the item 18 and the item 18 is lifted from an underlying floor 16, at least a portion of the weight of the item 18 is borne by the cooperating member 30.

By positioning the cooperating member 30 of one support 21 or 21' in cooperating relationship with one end of the item 18 and then effecting the movement of the carriage assembly 26 along the length of the strut 24 in a manner described herein, the one end of the item 18 is lifted to an elevated condition above the floor 16. Together, the pair of supports 21, 21' are capable of supporting the item 18 above the floor 16 for rotation about a substantially horizontal axis. As will be apparent herein, the pair of supports 21, 21' of the apparatus 20 provide a convenient means by which a relatively heavy item 18 can be manipulated into an elevated condition above the floor 16 for the purpose of unwinding a windable material 32 from the item 18 or winding the material 32 about the item 18. In the alternative and upon raising the item 18 from the floor 16, the item 18 can be manipulated (e.g. rolled) across the floor 16 for purposes of moving the item 18 between two sites as the rings 22 move in rolling engagement with the floor 16.

Figure 2:
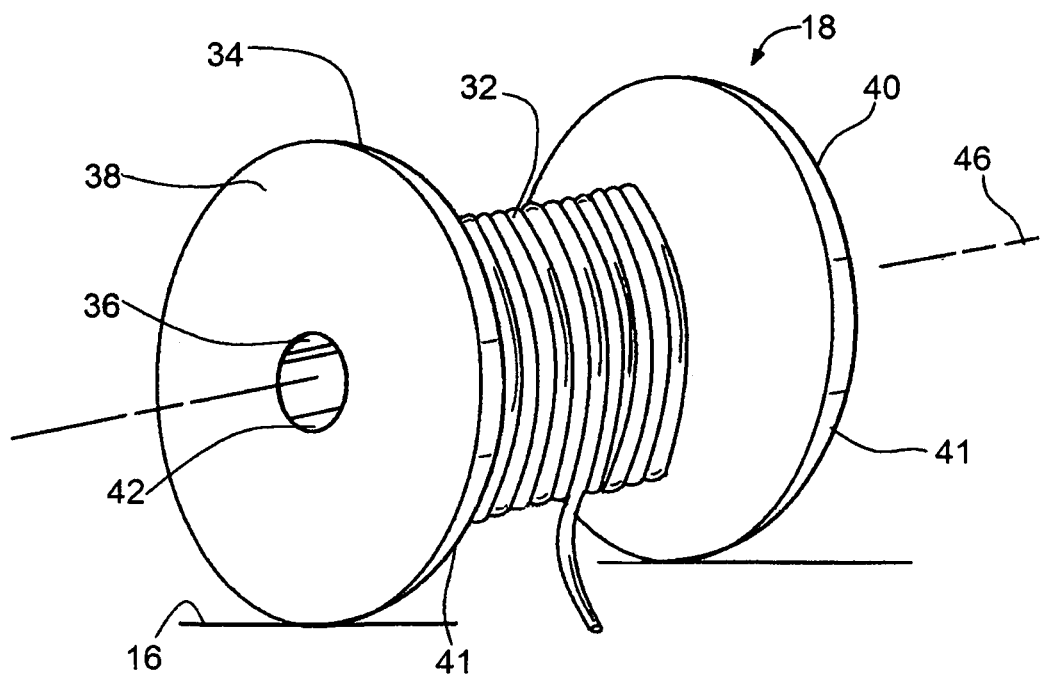
FIG. 2 is a perspective view of an exemplary item, or spool, of windable material of a class which is capable of being lifted with the apparatus of the present invention.

With reference to FIG. 2, there is illustrated an item 18 of a class of items which can be lifted and supported by the supports 21, 21' of the depicted apparatus 20. More specifically, the depicted item 18 of FIG. 2 is in the form of a spool 34 which includes an elongated barrel 36 about which a length of windable (e.g. coilable) material 32, such as electrical wire, steel cable, or rope, is wound and includes a pair of planar, disc-like flanges 38, 40 attached to the opposite ends of the barrel 36. Each flange 38 or 40 of the depicted spool 34 is circular in form and defines a cylindrical rim 41 along its peripheral edge. Furthermore, there is commonly provided a hollow bore 42 which extends through the center of both flanges 38 or 40 and the elongated barrel 36. In addition, the bore 42 defines an elongated axis 46 about which the spool 34 can be rotated (e.g. for purposes of unwinding material 32 from the spool 34) as the spool 34 is supported above the floor 16 by way of the pair of supports 21, 21'.

For purposes of lifting the spool 34 from the underlying floor 16 by way of the pair of supports 21, 21' the spool 34 is arranged upon the floor 16 so that the plane of each disc-like flange 38 or 40 of the spool 34 is arranged substantially vertically. That is to say, the spool 34 is arranged upon the floor 16 so that the rims 41 of both flanges 38, 40 engage the floor 16 and the barrel 36 of the spool 34 is oriented substantially parallel to the floor 16.

With reference to FIGS. 1, 3 and 4, the ring 22 of each support 21 or 21' is circular in form having annular, or cylindrically-shaped, inner and outer surfaces 48 and 50, respectively, and two opposite planar sidewalls 52, 54 which extend between the inner and outer surfaces 48, 50. Although the ring 22 can be constructed of any of a number of materials capable of resisting deformation when used to support an end of the spool 34 above the floor 16, the ring 22 of the depicted support 21 or 21' is constructed of steel tubing which is substantially rectangular (e.g. square) in cross section. The outer surface 50 of the ring 22 is adapted to engage the floor 16 as the ring 22 is moved, or rolled, across the floor 16 and, accordingly, the outer surface 50 is relatively smooth.

It is a feature of the apparatus 20 that its strut 24 includes an elongated mid-section 60 (FIG. 3) which extends across a substantial portion of the interior of the ring 22 for supporting the carriage assembly 26 for movement therealong between a first location, as illustrated in phantom lines in FIG. 3, disposed remote of the geometric center of the ring 22 and another, or second, location, as illustrated in solid lines in FIG. 3, disposed adjacent, or relatively close to, the geometric center of the ring 22. As will be apparent herein, the elongated section 60 of the strut 24 provides a guideway along which the carriage assembly 26 is permitted to move between the aforementioned first, FIG. 3 phantom-line, position and the aforementioned second, FIG. 3 solid-line, position, and to this end, can possess any of a number of shapes and sizes. Within the depicted support 21 or 21', the elongated section 60 is substantially linear along its length.

Furthermore, the strut 24 of each of the depicted supports 21, 21' of the apparatus 20 is relatively straight along the entirety of its length (which includes the elongated section 60), and is joined at its opposite ends, indicated 28 and 28 in FIG. 3, to the inner surface 48 of the ring 22 at two locations thereon (or to two sectors of the ring 22) which are about diametrically-opposed from one another across the ring 22. In the event that both the ring 22 and the strut 24 are comprised of steel tubing of relatively rectangular, or square, in cross sectional shape, the opposite ends of the strut 24 can be joined to the inner surface 48 of the ring 22 with welds.

Figure 7:
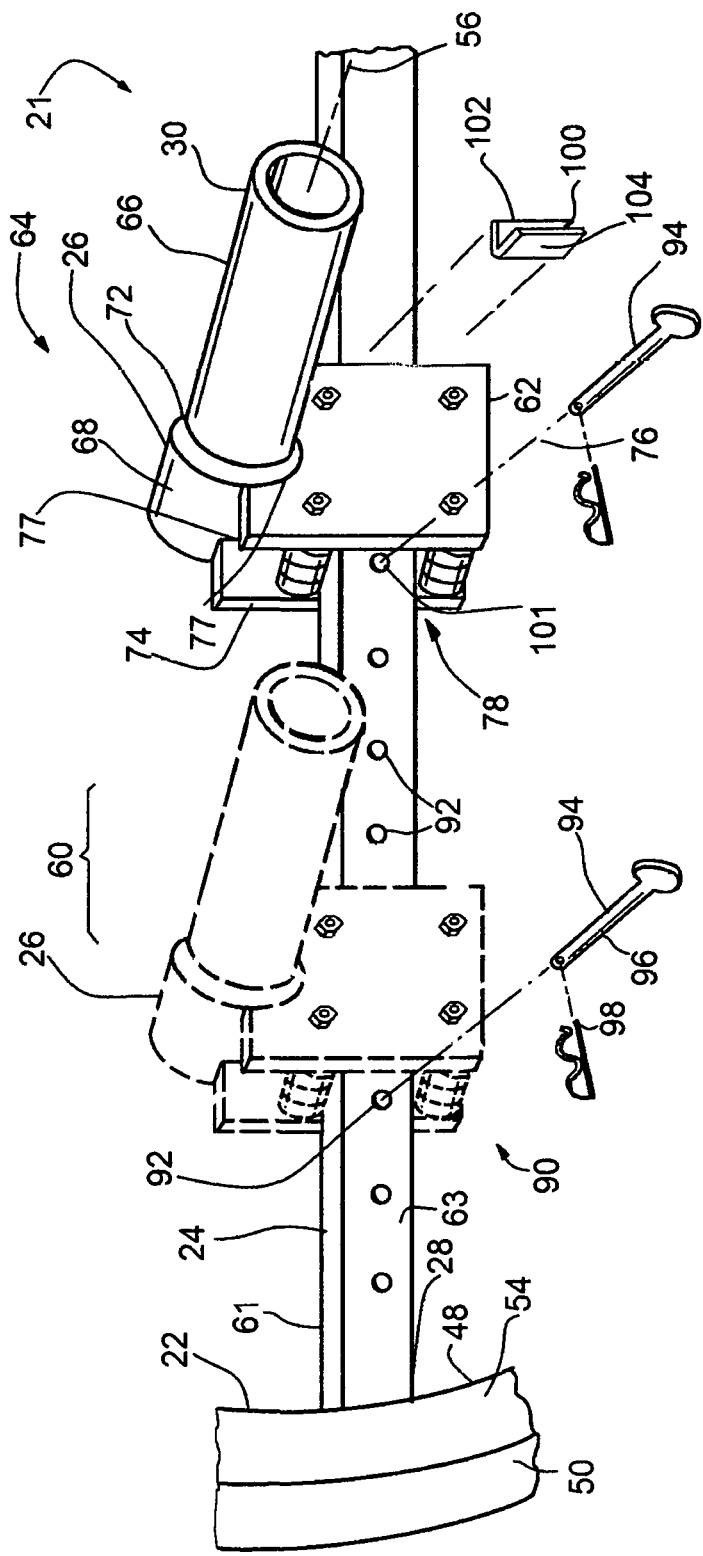
FIG. 7 is a perspective view of a larger fragment of the FIG. 3 support.

With reference to FIGS. 5-7, the carriage assembly 26 of each support 21 or 21' includes a carriage portion 62 which is mounted upon the strut 24 for movement along the length of the elongated mid-section 60 and means, generally indicated 64, associated with the carriage portion 62 for cooperating with an end of the barrel 36 of the item 18 so that when the apparatus 20 is used to support the corresponding end of the barrel 36 from the floor 18, at least a portion of the weight of the item 18 is supported by the cooperating means 64. Although the cooperating means 64 can take any of a number of forms, the cooperating means 64 of the depicted support 21 or 21' includes an arbor assembly 66 which includes the cooperating member 30, introduced earlier, which is rotatably supported by the carriage portion 62 by way of a bearing assembly 68. Within each depicted apparatus support 21 or 21', the cooperating member 30 is tubular in form.

The cooperating, or tubular, member 30 is arranged substantially normal to the plane of the ring 22 of each support 21 or 21' so that one (i.e. the free) end, indicated 70, of its two ends extends to one side of (the plane of) the ring 22 and the other end, indicated 72, of the tubular member 30 is mounted within the bearing assembly 68 to permit rotation of the tubular member 30 with respect to the carriage portion 62 about the longitudinal axis 56 in FIGS. 5 and 7. When placing the apparatus support 21 or 21' in its intended relationship with an end of the item 18 intended to be lifted by the apparatus support 21 or 21', the one end 70 of the tubular member 30 is guided (e.g. manually) into the hollow bore 42 of the barrel 36 of the item 18. Accordingly, the diameter of the tubular member 30 is smaller than that of the hollow bore 42 of the barrel 36 of the item 18 within which the tubular member 30 is intended to be directed.

As best shown in FIG. 6, the carriage assembly 26 of each support 21 or 21' of the depicted apparatus 20 includes a pair of plates 74, 76 which are arranged on opposite sides of the strut 24 and collectively support the bearing assembly 68 within which the tubular member 30 is rotatably supported so that the free end 70 of the tubular member 30 extends normal to the plane of the ring 22. To this end, the plates 74, 76 include semi-circular-shaped cuttouts 77 within which the bearing assembly 68 is positioned, and welds 79 (FIG. 5) are utilized to secure the bearing assembly 68 to the plates 74, 76.

In addition and to facilitate the movement of the carriage assembly 26 along the length of the mid-section 60 of the strut 24, the carriage assembly 26 includes an arrangement 78 of bearings which are interposed between the plates 74, 76 for rotatably engaging two opposite surfaces 69 and 71, respectively, (i.e. the top and bottom side surfaces as viewed in FIG. 6) of the mid-section 60 of the strut 24. Although the bearing arrangement 78 can take any of a number of forms, the bearing arrangement 78 of the depicted carriage assembly 26 includes cylindrical roller bearings 80 which are mounted upon pins (e.g. the shanks of bolts 82) which extend through both plates 74, 76 and the center of the roller bearings 80. In this connection, the bolts 82 are secured through aligned openings 84 formed in the plates 74, 76 with nuts 83 to thereby secure the plates 74, 76 adjacent the side surfaces, indicated 61 and 63 in FIG. 6, of the mid-section 60 of the strut 24. It follows that the carriage assembly 26 is free to move along the length of the mid-section 60 of the strut 24 as the roller bearings 80 move in rolling engagement with the opposite surfaces 69, 71 of the mid-section 60 of the strut 24.

Figure 8:
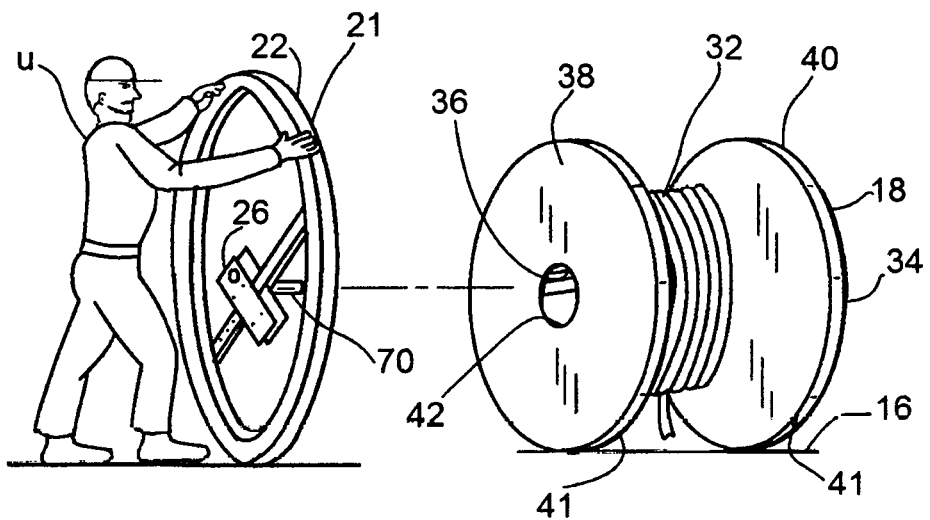
FIGS. 8-10 are perspective views illustrating sequential steps involved in using one of the two apparatus supports of FIG. 1 to lift one end of the barrel of the spool of FIG. 2 from the floor.

As mentioned earlier, the carriage assembly 26 of each apparatus support 21 or 21' is adapted to move along the mid-section 60 of the strut 24 between a first location, as illustrated in phantom in FIG. 3, disposed remote of the geometric center of the ring 22 and another, or second, location, as illustrated in solid lines in FIG. 3 disposed adjacent, or relatively close to, the geometric center of the ring 22. When the carriage assembly 26 is situated in the first location (and the support 21 or 21' is arranged upright alongside the item 18 as illustrated in FIG. 8), the tubular member 30 is disposed at about the same elevation (from the floor 16) as is the hollow bore 42 of the item 18 to enable the tubular member 30 of the carriage assembly 26 to be manipulated member end 70-first into the interior of the hollow bore 42. By comparison, when the carriage assembly 26 is situated in the aforedescribed second location (and the support 21 or 21' is arranged upright as illustrated in FIGS. 3 and 4), the tubular member 30 is disposed at about the geometric center, indicated 58 in FIG. 3, of the ring 22. It follows that when the carriage assembly 26 is positioned in the aforedescribed second location along the mid-section 60 of the strut 24, the longitudinal, or rotation, axis 56 of the tubular member 30 extends through the geometric center 58 of the ring 22.

In order for the supports 21, 21' to be capable of supporting the FIG. 2 item 18 above the floor 16 when the cooperating, or tubular, member 30 is positioned within the centrally-disposed barrel 36 of the item 18, the diameter of the ring 22 is greater than the height (i.e. diameter) of the flanges 38, 40 of the item 18 as measured upwardly along the flanges 38, 40 from the floor 16. This being the case and when the carriage assembly 26 is situated in the first (e.g. FIG. 3 phantom-line) location along the strut 24 in order that the tubular member 30 is positioned in cooperating relationship with the barrel 36 of the FIG. 2 item 18, the tubular member 30 is necessarily situated below the elevation of the geometric center 58 (FIG. 3) of the ring 22. Therefore and upon subsequent movement of the carriage assembly 26 along the length of the strut 24 from the first location therealong toward the second location therealong while the tubular member 30 is accepted by the hollow bore 42 of the barrel 36, the barrel 36 of the item 18 is necessarily raised by the tubular member 30 to about the geometric center 58 of the ring 22 so that the rims 41 of the item flanges 38, 40 are lifted to the elevated condition above the floor 16.

With reference to FIG. 7, it is a feature of each apparatus support 21 or 21' that it includes stop means, generally indicated 90, for providing limits to the movement of the carriage assembly 26 along the length of the mid-section 60 of the strut 24. That is to say, the stop means 90 prevents movement of the carriage assembly 26 along the strut mid-section 60 beyond, or outboard of, the aforementioned first and second locations. To this end and for limiting the movement of the carriage assembly 26 along the strut 24 further from the second location than the first location, the strut 24 defines a series of through-openings 92 along the length of the mid-section 60, and the stop means 90 includes a headed pin 94 having a shank 96 which can be inserted shank-end-first through any of the through-openings 92 and which can be secured through the through-opening 92 with a key 98 directed through the bolt shank 96 at the end thereof opposite the head of the pin 94. Once secured through a selected through-opening 92, the portions of the pin 94 disposed outboard of the side surfaces 61, 63 of the strut 24 act as a stop which prevents the movement of the carriage assembly 26 leftwardly along the strut 24 (as viewed in FIG. 7) further from the second location than the first location.

It will be understood that the first location (at which the cooperating member 30 of the carriage assembly 26 is positionable in cooperating relationship with the barrel 36 of the item 18 may be disposed at a different location along the length of the strut 24 for one item than it is for another because of the different diameters that the flanges of the items may possess. For example, when an apparatus support 21 or 21' is used to lift an item whose flanges are relatively small in height when compared to the diameter of the ring 22, the first location along the strut 24 at which the carriage assembly 26 must be positioned (and thus positionable in cooperating relationship with the barrel of the item) will be disposed much further along the strut 24 from the geometric center of the ring 22 than would be case if the height (i.e. diameter) of the flanges of the item was relatively close to the diameter of the ring 22. This being true, the series of through-openings 92 provided along the length of the strut 24 accommodates any of a number of first locations at which the carriage assembly 26 can be positioned at the outset of an item-lifting operation depending upon the height of the flanges of the item desired to be lifted.

On the other hand and to limit the movement of the carriage assembly 26 along the length of strut 24 further from the first location than the second location, the stop means 90 includes a flange 100 (FIG. 7) of substantially L-shaped cross section having one leg 102 which is fixedly attached (e.g. welded) to the strut 24 at a location therealong so that the other leg 104 of the flange 100 acts as a stop which prevents the movement of the carriage assembly 26 further along the strut 24 from the first location than the second location. That is to say, that when the carriage assembly 26 has been moved along the length of the strut 24 and into abutting relationship with the leg 104 of the flange 100, the carriage assembly 26 is disposed in its second location along the length of the strut 24 so that the tubular member 30 is disposed at about the geometric center 58 (FIG. 3) of the ring 22 and so that the longitudinal axis 56 of the tubular member 30 extends through the geometric center 58 of the ring 22 or, more specifically, the outer surface 50 of the ring 22.

It follows from the foregoing that the pin 94 (whose position along the length of the strut 24 can be altered, as necessary) and the flange 100 provide limits to the movement of the carriage assembly 26 along the length of the strut 24 between the aforedescribed first dud second locations. On one hand, the position of the pin 94 along the length of the strut 24 establishes, or defines, the first location at which the carriage assembly 26 is initially positioned along the strut 24, and on the other hand, the flange 100 establishes, or defines, the second location at which the carriage assembly 24 is subsequently positioned along the strut 24. Thus, the pin 94 and the flange 100 act as stops which confine the movement of the carriage assembly 26 along the mid-section 60 of the strut 24 to movement between the first and second locations along the strut 24. Accordingly, the range of permitted movement of the carriage assembly 26 along the strut 24 during an item-lifting operation is about equal to the distance between the midpoints of the first and second locations.

With reference still to FIG. 7, the strut 24 also defines a through-opening 101 along its length at a location adjacent the side of the carriage assembly 26 opposite the flange 100 when the carriage assembly 26 is disposed in its second location along the strut 24. The through-opening 101 is adapted to accept the shank of the pin 94 inserted endwise therethrough so that when the carriage assembly 26 is positioned within the second location along the strut 26, the pin 94 (once removed from one of the series of through-openings 92) can be inserted within the through-opening 101 (and secured therethrough with the key 98) to thereby lock the carriage assembly 26 in its second location along the strut 24 between the flange 100 and the pin 94. Therefore, by locking and thereby securing the carriage assembly 26 in its second location along the strut 24, the return of the carriage assembly 26 toward the first location along the length of the strut 24 when the apparatus 20 (i.e. either one or both of the apparatus supports 21, 21') is used to manipulate or move the item 18 across the floor 16 is prevented.

It also follows that the mid-section 60 of the strut 24 operates as a guideway along which the carriage assembly 26 is guided as the carriage assembly 26 moves along the mid-section 60 between the first and second locations therealong. Furthermore and as the carriage assembly is moved along the mid-section 60, the tubular member 30 of the carriage assembly 26 is maintained in a normal relationship with the plane of the ring 22.

The use of the apparatus 20 can be best understood with reference to FIGS. 8-13 which illustrate sequential steps performed by a user U when utilizing the apparatus 20 (and its supports 21 and 21') to lift an item 18 one end-at-a-time from the underlying floor 16. In this regard and in preparation of a lifting operation, the item 18 is arranged in its position depicted in FIG. 8 so that the rims 41 of both of the flanges 38, 40 are positioned in engagement with the floor 16, and the barrel 36 of the item 18 is disposed substantially parallel to the floor 16. As will be apparent herein and in order to raise both of the rims 41 of the item 18 from the floor 16, one end of the item 18 (i.e. the end of the barrel 36 of the item 18 associated with the flange 38) is raised from the floor 16 by way of the apparatus support 21, and then the other end of the item 18 (i.e. the end of the barrel 36 of the item 18 associated with the other flange 40) is raised from the floor 18 by way of the apparatus support 21'. Accordingly, the description provided herein of an item-lifting operation begins with the use of one apparatus support 21.

To initiate an item-lifting operation and as best shown in FIG. 8, one apparatus support 21 is manually supported upright (i.e. so that the plane of its outer ring 22 oriented substantially vertically) and simultaneously maneuvered to a position adjacent one side (i.e. the flange 38-end) of the item 18 so that the free end 70 of the tubular member 30 is received by the hollow bore 42 of the barrel 36 of the item 18. To accommodate the acceptance of the tubular member 30 by the bore 42 of the item barrel 36, the location of the carriage assembly 26 along the length of the strut 24 may have to be altered, as needed, so that the tubular member 30 is disposed at about the same height (from the floor 16) as that of the barrel 56. Such an adjustment in the location (i.e. the first location) of the carriage assembly 26 along the length of the strut 24 can be made, for example, by removing the pin 94 from one through-opening 92 defined along the length of the strut 24 and replacing the pin 94 through an alternative through-opening 92 alongside the carriage assembly 26 to thereby prevent the carriage assembly 26 from moving along the strut 24 in a direction closer to the strut end 28 (FIG. 7) than the first location. It will be understood that during this initial maneuvering of the apparatus support 21 alongside the flange 38-end of the item 18, the tubular member 30 is directed endwise (i.e. free end 70-first) into the hollow bore 42 of the barrel 36 which opens out of the flange 38.

Figure 9:
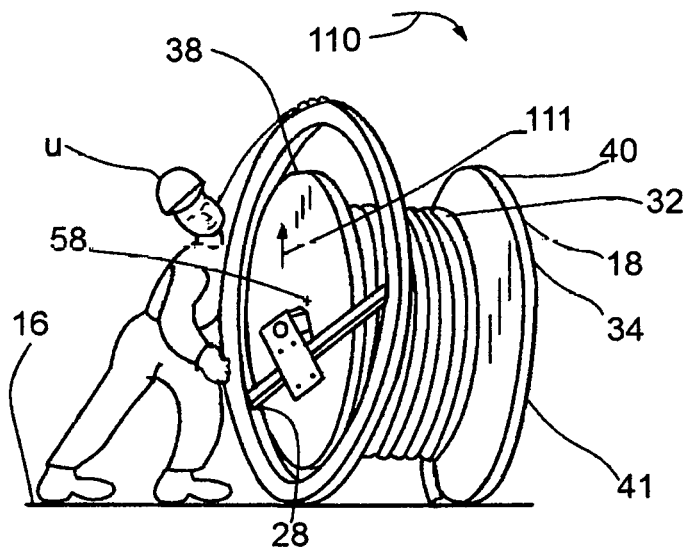
Figure 10:
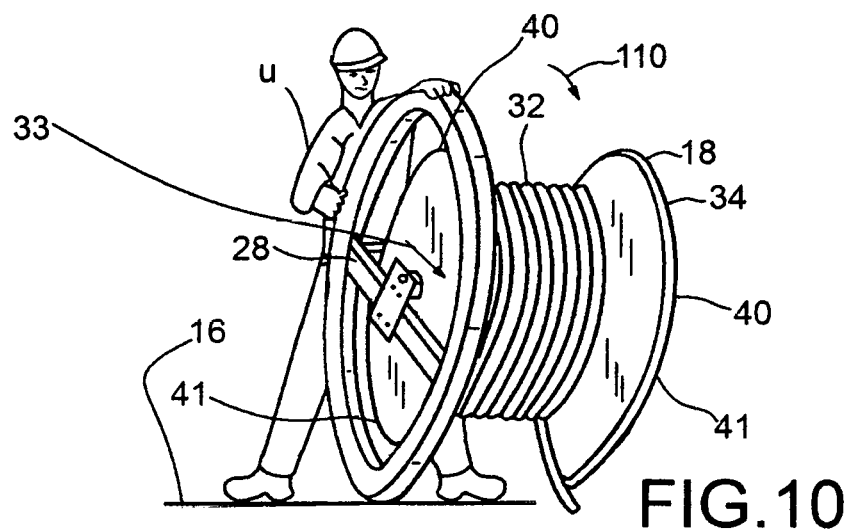

With the free end 70 of the tubular member 30 of the apparatus 20 thereby accepted (preferably, fully-accepted) by one end of the barrel 36 of the item 18, the apparatus support 21 is then manually rolled by the user U along the floor 16 in the direction of the FIG. 9 arrow 110 through several degrees of rotational movement about the center 58 of the ring 22 with the objective in mind to raise the strut end 28 in the direction of the FIG. 9 arrow 111 to a higher elevation so that the barrel 36 of the item 18 (by way of the carriage assembly 26) is manually raised from a first elevation, as depicted in FIG. 9, to a second, or higher, elevation, as depicted in FIG. 10, at which the carriage assembly 26 is disposed above the elevation of the geometric center 58 (FIG. 9) of the ring 22.

Because the carriage assembly 26 is prevented (by the pin 94) from moving radially outwardly along the strut 24 as the ring 22 is rotated in the direction of the FIG. 9 arrow 110, the manually lifting the strut end 28 (as the ring 22 is rolled) also lifts the carriage assembly 26 and the one end of the barrel 36 of the item 18 within which the tubular member 38 is received. For purposes of rolling the ring 22 is this manner, the user grasps the ring 22 at spaced locations therealong and forcibly rolls the ring 22 of the apparatus frame 21 through several degrees of rotation. As the ring 22 is rotated in this manner, the carriage assembly 26 is forcibly raised (as the strut end 28 is raised) in somewhat of a camming action. That is to say, because of the disposition of the carriage assembly 26 inwardly of the regions of the ring 22 being grasped by the user for purposes of rolling the ring 22, the ring 22 provides the user U with an appreciable mechanical advantage as he rolls the ring 22 across the floor 16.

As the carriage assembly 24 continues to be lifted from the floor 16 as the ring 22 continues to be rolled through several rotational degrees about the geometric center 58, the flange 38-end of the barrel 36 of the item 18 is raised from the floor 16 by way of the tubular member 30, and when lifted high enough, the carriage assembly 26 will be disposed slightly above the geometric center 58 (FIG. 9) of the ring 22. Meanwhile, the rolling of the ring 22 of the apparatus support 21 through the aforementioned several rotational degrees alters the orientation of the mid-section 60 of the strut 24 relative to the horizontal so that when the carriage assembly 26 is elevated above the geometric center 58 of the ring 22, the mid-section 60 is sloped downwardly as a path is traced therealong from the first location toward the second location. Therefore, upon reaching an elevated position at which the carriage assembly 26 is higher than the geometric center 58 of the ring 22, the carriage assembly 26 is permitted, under the influence of its own weight and that of the end of the barrel 36 of the item 18 borne by the tubular member 30, to move relative to and along the mid-section 60 (i.e. in the direction of the FIG. 10 arrow 33) from its first location along the strut 24 toward and to the second position therealong. Thus, when the ring 22 is rolled through the aforementioned several rotational degrees until the carriage assembly 26 reaches a position which is high enough, gravity influences and aids the movement of the carriage assembly 26 along the mid-section 60 toward the second location therealong.

It follows that because of the downwardly-sloped orientation of the strut mid-section 60 and the gravitational influence upon the carriage assembly 24 when the strut end 28 has been raised to the elevated position depicted in FIG. 10, the carriage assembly 26 is permitted to move relative to and along the length of the strut 24 from the first location therealong toward the geometric center 58 of the ring 22. This downward movement of the carriage assembly 26 along the strut 24 (e.g. in the direction of the FIG. 10 arrow 33) continues until the body of the carriage assembly 26 abuts the leg 102 of the flange 100 and the movement of the carriage assembly 26 along the strut 24 is thereby halted. Upon abutting the leg 102, the carriage assembly 26 will have reached its second location along the mid-section 60 and the rotational axis 56 of the tubular member 30 is substantially aligned with the geometric center 58 of the ring 22 of the apparatus support 21. At that point, the FIG. 7 pin 94 (used to prevent movement of the carriage assembly 26 along the strut 24 from the first location toward the strut end 28) is removed from the through-opening 92 and re-inserted through the through-opening 101 (FIG. 7) defined along the strut 24 to lock (in conjunction with the cooperating flange 100) the carriage assembly 36 in its second location along the strut 24.

Figure 11:
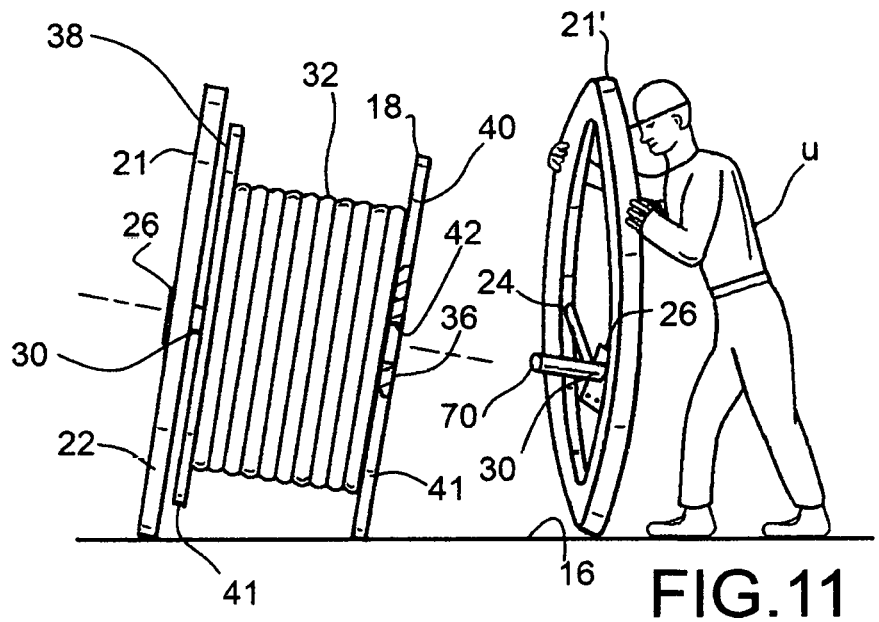
FIG. 11 is a perspective view, shown partially in section, depicting a step involved in utilizing the other of the two apparatus supports of FIG. 1 to lift the other, or floor-engaging, end of the barrel of the spool of FIG. 2 (and FIGS. 8-10) from the floor.

With one end of the barrel 36 (i.e. the flange 38-end of the barrel 36) of the item 18 thereby held in an elevated condition by the tubular member 30 at substantially the geometric center 58 of the ring 22, the cylindrical rim 41 associated with the lifted, flange 38-end of the item 18 is disposed in a spaced relationship with the underlying floor 16, as illustrated in FIG. 11, and the user U is free to maneuver the lifted flange 38-end of the item 18 across the floor 18 as the ring 22 is maneuvered, or rolled, across the floor 16. It will be understood, however, that as the one, lifted flange 38-end of the item 18 is maneuvered with only one apparatus support 21, the rim 41 of the other, non-lifted flange 40-end of the item 18 remains in engagement with the floor 16. At the same time, however, the ring 22 is permitted to roll (i.e. rotate) about its geometric center during such a maneuvering operation relative to the item 18 as the tubular member 30 (upon which the flange 38-end of the item rests) is free to rotate relative to the ring 22 by way of the bearing assembly 68 (FIGS. 5 and 7).

It will also be understood from the foregoing description that the effecting of the movement of the carriage assembly 26 along the length of the strut mid-section 60 is carried out in a two-stage process wherein the first stage includes a lifting of the carriage assembly 26 to an elevation above the floor 16 which is higher than the position assumed by the carriage assembly 26 when the carriage assembly 26 is disposed in its second location along the strut mid-section 60. Then, the second stage results in the movement of the carriage assembly 26 along the mid-section 60 of the strut 24 to the second location therealong under the gravitational influence of the weight of the item 18 borne by the tubular member 30 of the carriage assembly 26.

In order to raise the other, non-lifted flange 40-end of the item 18 into a spaced relationship with the underlying floor 16, the aforementioned steps are repeated with the other apparatus support 21' at the other (non-lifted) end of the item 18. In other words, the carriage assembly 26 of the support 21' is arranged in its first location along the strut 24, and the other apparatus support 21' is positioned adjacent the other (non-lifted) flange 40-end of the item 18, as is best shown in FIG. 11, so that the end 70 of the tubular member 30 is directed generally toward the bore 42 provided in the other side of the item 18 (i.e. in the flange 40-end of the item 18). The apparatus support 21' is then manipulated against the flange 40 of the item 18 so that the tubular member 30 is accepted by the hollow bore 42 of the barrel 36 disposed at the flange 40-end of the item 18.

Figure 12:
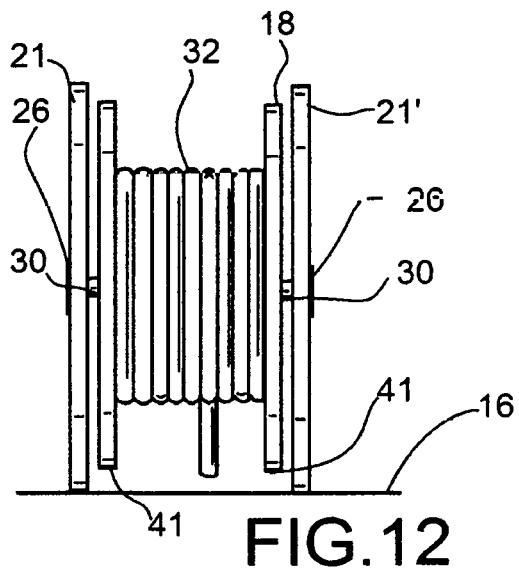
FIG. 12 is an end elevational view depicting an assembled arrangement comprised of the two apparatus supports of FIG. 1 and the spool of FIG. 2 (and FIG. 11) when supported above the floor by the supports of FIG. 1.
Figure 13:
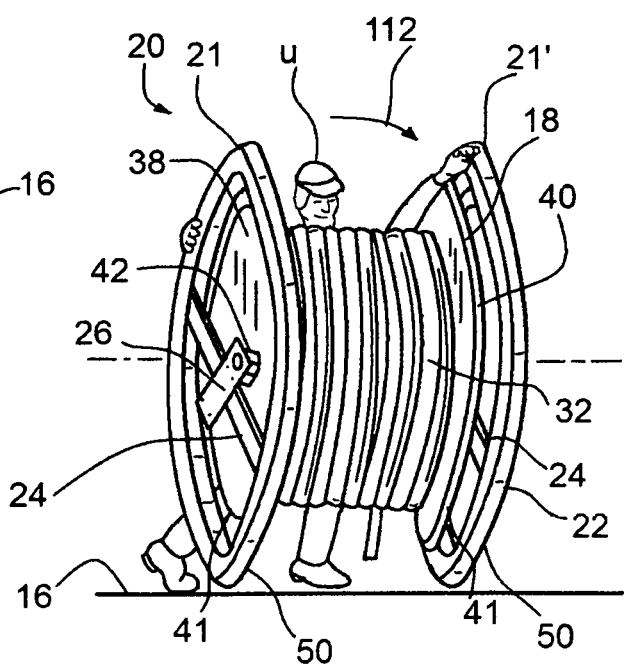
FIG. 13 is a perspective view of the assembled arrangement of FIG. 12 shown being rolled across the floor.

By subsequently maneuvering the apparatus support 21' (e.g. by appropriately rolling the ring 22 of the support 21' through several degrees of rotation about the geometric center of the ring 22) so that the carriage assembly 26 thereof is moved from its first location along the length of the strut 24 to its second location therealong, the cylindrical rims 41 of both end flanges 38, 40 of the item 18 are in a spaced relationship with the underlying floor 16, as illustrated in FIG. 12. By thereafter locking the carriage assembly 26 of the support 21' in its second location along the strut 24, the rims 41 of both flanges 38, 40 of the item 18 are held in a spaced relationship with the underlying floor 16 by way of the apparatus supports 21 and 21', the item 18 is free to be rotated about the axis 56 of the tubular members 30 by way of the bearing assemblies 68 (FIGS. 5 and 7) in a material winding or unwinding operation. Alternatively and as is depicted in FIG. 13, the item 18 can be moved (i.e. manually rolled) across the floor 16 by the user U by rolling the apparatus supports 21, 21' in the direction of the arrow 112 (FIG. 13) as the outer surfaces 50 of the rings 22 of both apparatus supports 21 and 21' move in rolling engagement with and across the floor 16. Since the rings 22 of the supports 21, 21' are grasped by the user U for purposes of rolling the item 18 across the floor 16 at locations disposed outboard of the rims 41 of the flanges 38, 40, the item 18 is easier to roll across the floor 16 by way of the supports 21, 21' than if the item 18 is rolled across the floor 16 with the rims 41 in engagement with the floor 16.

Figure 14:
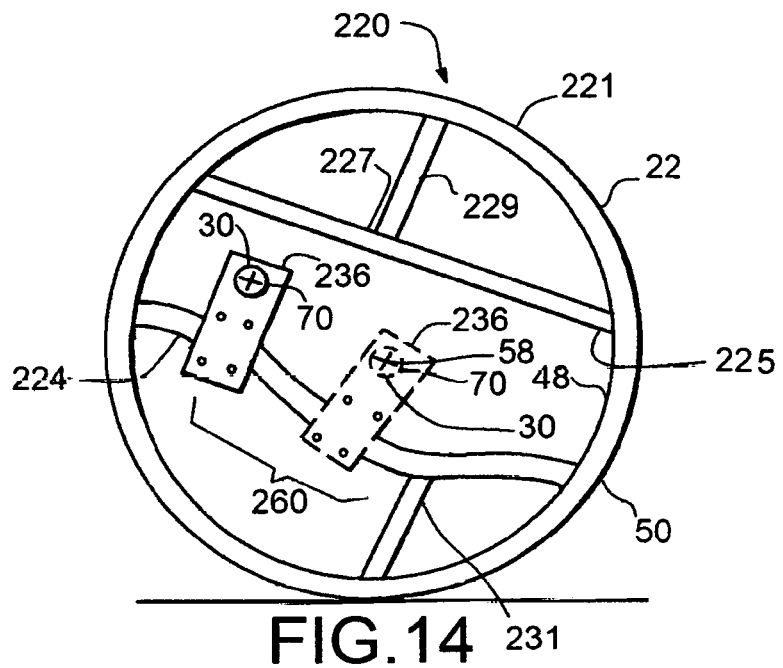
FIG. 14 is a side elevation view, similar to that of FIG. 3, of a support of another apparatus within which features of the present invention are embodied.

While each strut 24 of the apparatus supports 21, 21' of FIGS. 1 and 3-13 have been shown and described as being straight along the entirety of its length, the strut of an apparatus embodying features of the present invention is not necessarily so limited. For example and with reference to FIG. 14, there is illustrated an apparatus support 221 of an alternative embodiment, generally indicated 220, of an apparatus within which features of the invention are embodied. Components of the apparatus support 221 of FIG. 14 which are identical to those of the apparatus support 21 or 21' of FIGS. 1 and 3-13 are accordingly given the same reference numerals. Briefly, the apparatus support 221 of FIG. 14 includes a ring 22, a strut 224 having an arcuate mid-section 260 which spans a portion of the interior of the ring 22, and a carriage assembly 226 which is mounted upon the mid-section 260 of the strut 224 for movement between a first location therealong (as illustrated in solid lines in FIG. 14) at which the tubular member 30 of the carriage assembly 226 can be directed end 70-first into the hollow bore 42 (FIG. 2) of an item 18 resting upon the floor 16 and a second location therealong (as illustrated in phantom in FIG. 14) at which the longitudinal axis of the tubular member 30 is in registry with, or extends through, the geometric center 58 of the ring 22. In order to enhance the strength of the apparatus 221, the apparatus 221 also includes an additional, or T-shaped strut arrangement 225 (having a top section 227 and a leg 229) which is joined (e.g. welded) to the ring 22 of each of the three points of the T of the T-shape, and the strut 224 is braced with a brace member 231 which extends between the strut 224 and the ring 22.

Even though the mid-section 260 of the strut 224 is arcuate in shape as a path is traced along its length, the carriage assembly 226, by way if its roller bearings, is still free to move along (e.g. rollably engage) the mid-section 260 as the carriage assembly 226 is moved from its first location along the length of the strut mid-section 260 to the second location therealong. Therefore and after positioning the tubular member 30 of the carriage assembly 226 into the hollow bore 42 (FIG. 2) disposed at one end of the item 18, and thereafter effecting the movement of the carriage assembly 226 along the strut 224 (e.g. in the manner described above in connection with the raising of the carriage assembly 26 of the apparatus supports 21, 21' of FIGS. 1 and 3-13) to move the carriage assembly 226 from the first location along the strut 224 to the second location therealong to thereby raise the one end of the item 18 (i.e. the rim 41 thereof) from the floor 18.

Figure 15:
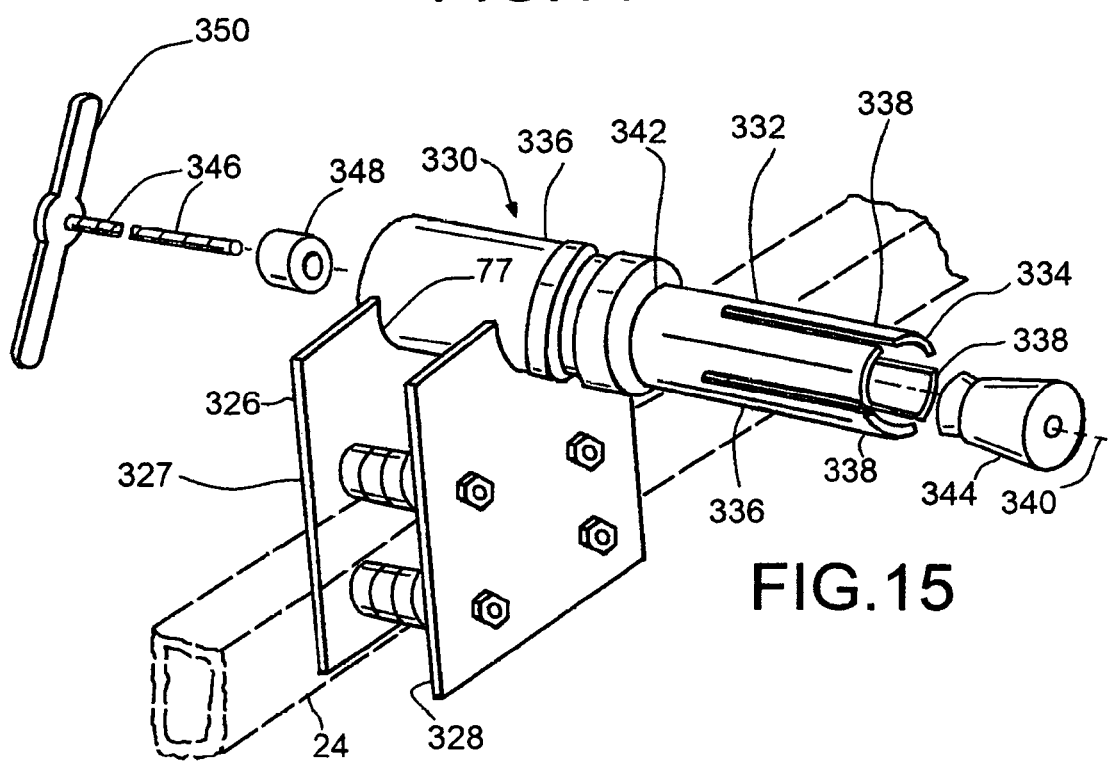
FIG. 15 is a perspective view of an exemplary carriage assembly for an apparatus support whose cooperating member is capable of being affixed within a hollow interior surface of an object, such as the barrel of the spool of FIG. 2.
Figure 16:
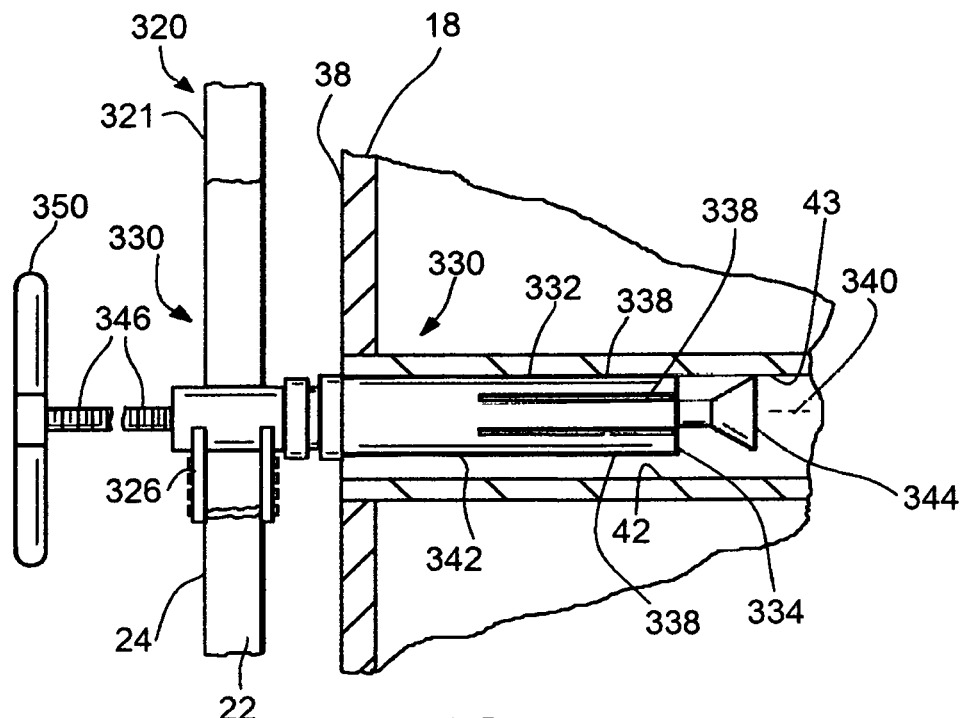
FIG. 16 is an end elevation view, shown partially in longitudinal cross-section, of the FIG. 15 carriage assembly having a cooperating member which is positioned within the barrel of the spool of FIG. 2 at one end thereof and illustrating the cooperating member when disposed in an undeformed, or collapsed, condition within the spool barrel.
Figure 17:
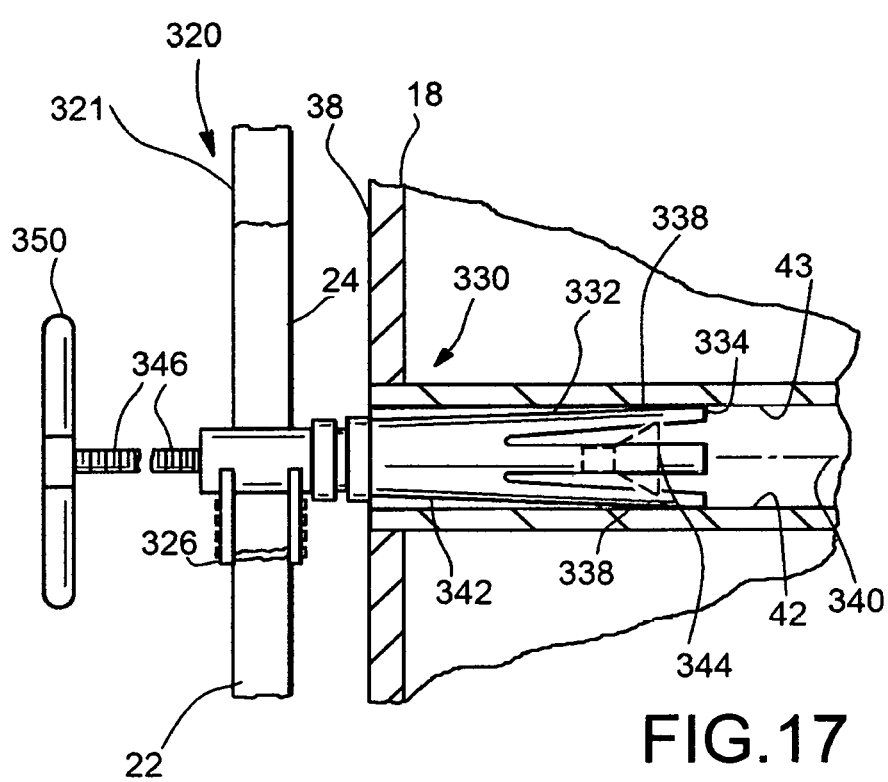
FIG. 17 is a view of the carriage assembly and spool of FIG. 16, which view is similar to that of FIG. 16, but illustrating the cooperating member when disposed in an deformed, or expanded, condition within the spool barrel.

With reference to FIGS. 15-17, there is depicted an apparatus 320 including a support 321 within which features of the present invention are embodied, having a carriage assembly 326 having a capacity to be releasably locked to an item 18 (FIGS. 16 and 17) desired to be lifted with the apparatus support 321. That is to say, the carriage assembly 326 can be releasably secured in place within the bore 42 of the item 18 so that during an item-lifting operation performed with the support 321, the carriage assembly 326 is prevented from backing out of the item 18. Inasmuch as forces can be generated during the use of an apparatus support embodying features of the present invention which could promote the migration of a tubular member (e.g. the tubular member 30 of the apparatus supports 21, 21' of FIGS. 1 and 3-13) out of the item 18 being supported by the apparatus support, the capacity of the carriage assembly 326 to be releasably locked in place within the item 18 enables the carriage assembly 326 to counter such migration-inducing forces and is advantageous in this respect.

With reference still to FIGS. 15-17, the carriage assembly 32G includes a pair of plates 327, 328 which are rollably mounted upon the strut 24 (illustrated in phantom in FIG. 15) in the same manner in which the plates 74, 76 of the apparatus supports 21, 21' of FIGS. 1 and 3-13 are mounted upon the strut 24 of the apparatus supports 21, 21' and also includes a cooperating assembly 330 including an elongated, expandable cooperating member 332 having a free end 334 which extends away from one side of the carriage assembly 326. As best shown in FIG. 15, the cooperating assembly 330 includes a hollow sleeve member 336 which is fixedly secured (e.g. as with welds) within the cutouts 77 of the plates 327, 328, and the expandable member 332 includes a plurality of axially-extending sections 338 which are positioned about the longitudinal axis, indicated 340, of the expandable member 332. The sections 338 are joined together to one another at the end, indicated 342, of the expandable member 332 opposite the free end 334, and the expandable member 332 is fixedly joined at its end 342 to the hollow sleeve member 336.

In addition, the sections 338 extend substantially axially of the expandable member 332 from the end 342 thereof to the free end 334 thereof. Within the depicted carriage assembly 326, the sections 338 are capable of being spread apart at the end 334 of the member 332 between an undeformed condition, as illustrated in FIG. 16 (at which the member end 334 possesses its smallest diameter), to an expanded condition, as illustrated in FIG. 17 (at which the diameter of the member end 334 is increased), and are constructed of a resiliently-flexible material which is inherently biased from the FIG. 17 deformed, or spread-apart, condition toward the FIG. 16 undeformed, or collapsed, condition. A conically-shaped actuator 344 is positioned adjacent the end 334 of the member 332 and is secured about a threaded rod 346 (FIG. 15) which extends axially through the center of the member 332 and is supported therealong by way of the actuator 344 and an internally-threaded collar 348 which, in turn, is supported in a fixed condition within the sleeve member 336.

By rotating the rod 346 relative to the collar 348 (by way of a handle 350) in one rotational direction about the longitudinal axis 340, the conical actuator 344 is moved axially along the interior of the expandable member 332 toward the member end 342 so that the axially-extending sections 338 are spread apart by the outer surfaces of the conical actuator 344. Conversely and by rotating the rod 346 relative to the collar 348 (by way of the handle 350) in the opposite rotational direction about the axis 340, the conical actuator 344 is moved axially along the interior of the expandable member 332 and away from the member end 342 so that the axially-extending sections 338 are permitted to return toward the FIG. 16 undeformed condition at which the sections 342 are collapsed together.

It follows that after maneuvering the expandable member 332 of the carriage assembly 326 into the hollow bore 42 of the item 18 (while the axially-extending sections 338 are positioned in the FIG. 16 collapsed condition), the handle 350 can be appropriately rotated about the axis 340 to expand the axially-extending sections 338 radially outwardly of the axis 340 to the FIG. 17 expanded condition at which the exterior surfaces of the sections 338 bear against the interior surfaces, indicated 43 in FIGS. 16 and 17) of the hollow bore 42 of the barrel 36 of the item 18. The bearing of the sections 338 against the bore interior surfaces 43 in this manner results in a frictional gripping engagement between the engaging surfaces of the sections 338 and the bore 42 to thereby lock the carriage assembly 326 (and the apparatus support 321 associated therewith) to the item 18.

Figure 23:
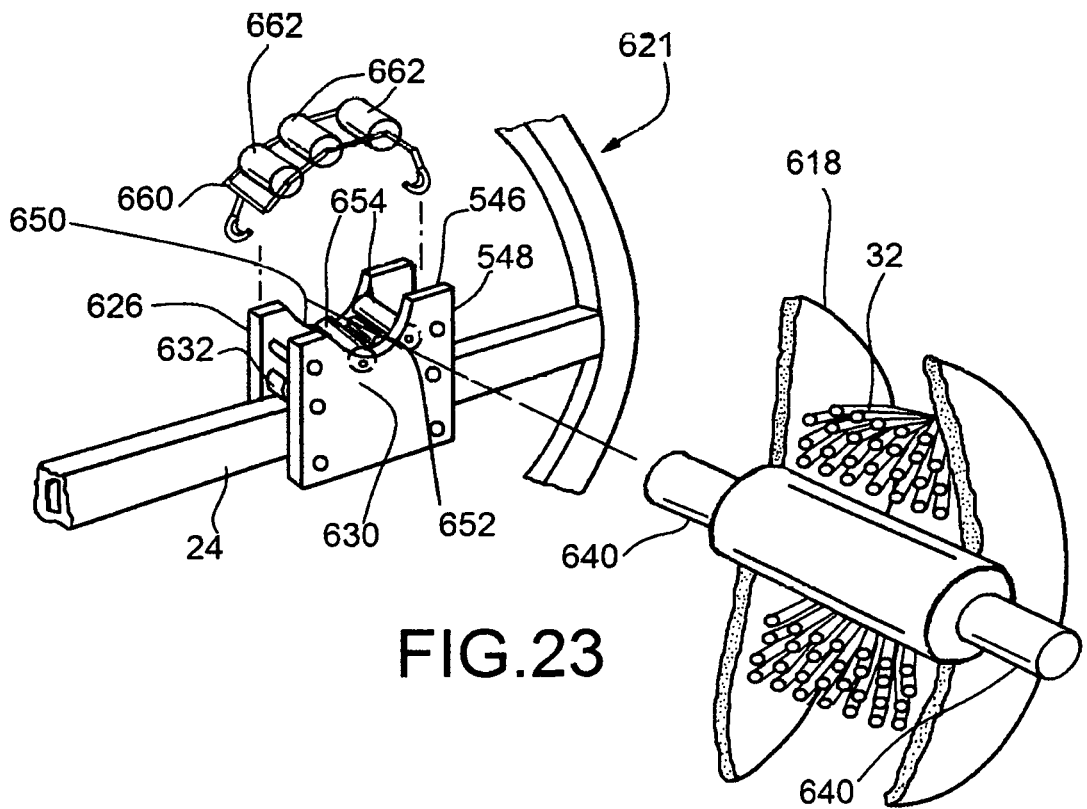
FIG. 23 is a perspective view of still another apparatus having a support whose carriage assembly embodies features of the present invention.

When the apparatus support 321 is desired to be removed from the item 18, the handle 350 is appropriately rotated to permit the sections 338 to return to the FIG. 16 collapsed condition (thereby reducing the diameter of the expandable member 332 at the end 334 thereof) so that the expandable member 332 can be withdrawn from the bore 42. Although the carriage assembly 326 has been described herein as being capable of securing the apparatus support 321 to an item 18 as the outer surfaces of its axially-extending sections 338 bear against the interior surfaces 43 of the centrally-disposed bore 42 of the item 18, the same principles apply when securing the carriage assembly 326 (and its expandable member 332) to the interior of a hollow pipe or tube 502 (FIG. 23).

Figure 18:
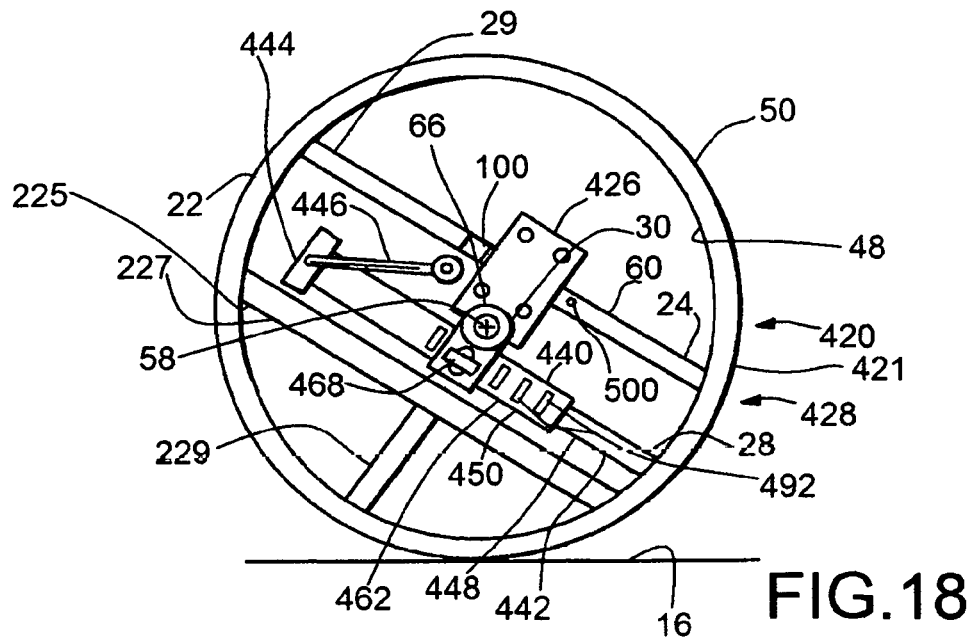
FIG. 18 is side elevation view, similar to that of FIG. 3, of a support of an alternative apparatus within which features of the present invention are embodied.
Figure 19:
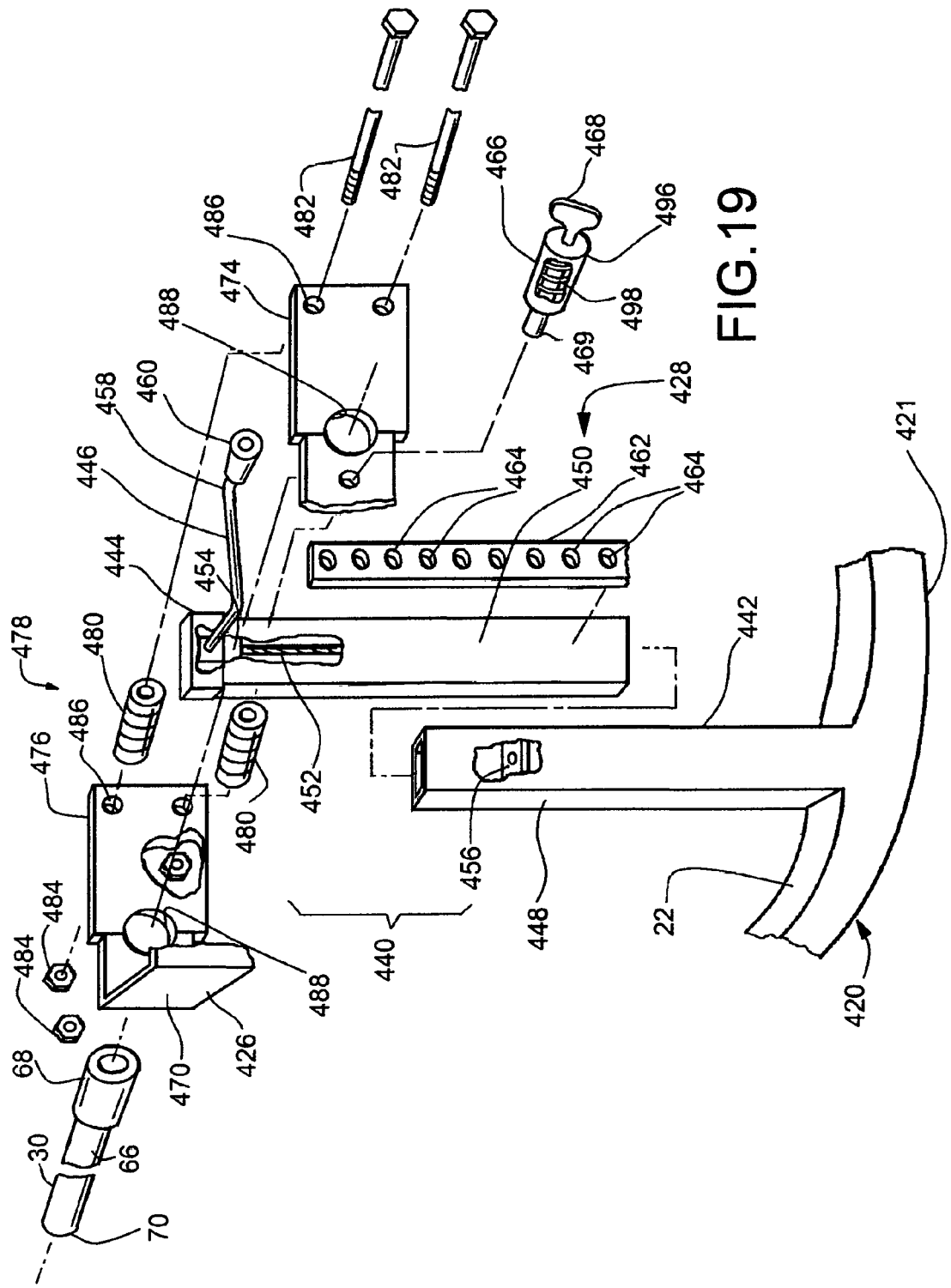
FIG. 19 is a perspective view of a fragment of the support of FIG. 18, shown exploded.
Figure 20:
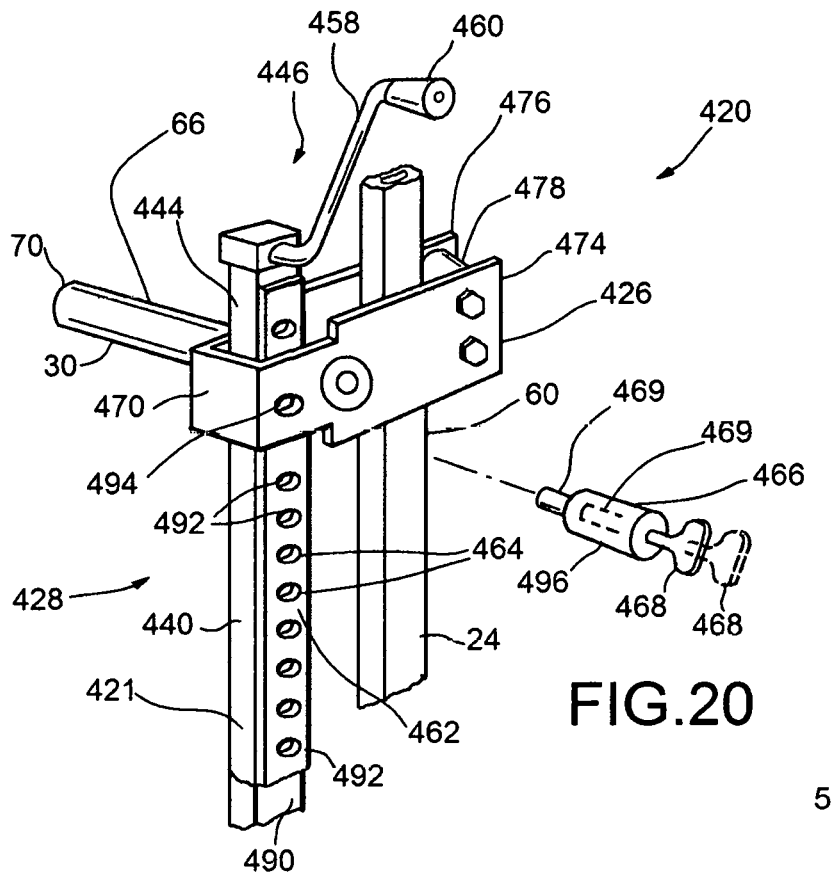
FIG. 20 is a perspective view of a portion of the fragment illustrated in FIG. 19, shown partially assembled.

With reference to FIGS. 18-20, there is shown an apparatus support 421 of an alternative apparatus 420 within which features of the present invention are embodied. Components of the apparatus support 421 which include a ring 22 and a strut 24 and which are identical to those of the support 21 or 21' of the apparatus 20 of FIGS. 1 and 3-13 (or the apparatus support 221 of FIG. 14) accordingly bear the same reference numerals. Briefly and as will be apparent herein, the support 421 of the depicted alternative apparatus 420 (unlike the apparatus supports 21, 21' of the apparatus 20 of FIGS. 1 and 3-13 or the apparatus support 221 of FIG. 14) do not rely upon the manual manipulation of the ring 22 of the apparatus support 421 to effect the movement of its carriage assembly, indicated 426, from the first location to the second location along the length of the strut 24.

Instead, the apparatus support 421 includes mechanical means, generally indicated 428, for mechanically effecting the movement of the carriage assembly 426 between a first location along the strut 24 at which the tubular member 30 of the carriage assembly 426 can be positioned in cooperating relationship with (e.g. received by) the hollow bore 42 (FIG. 2) at one end of the item 18 desired to be lifted from the floor 16 and a second location along the strut 24 (as shown in FIG. 18) so that when the carriage assembly 426 is positioned at the second location and the tubular member 30 is accepted by the hollow bore 42 of the item 18, the longitudinal axis of the barrel 36 of the item 18 is substantially aligned with the geometric center 58 of the ring 22.

As best shown in FIG. 19, the carriage assembly 426 includes a pair of plates 474, 476 which are disposed on opposite sides of the strut 24 and which are fixedly joined to together by way of a base portion 470 disposed at one end of the plates 474, 476 so that the plates 474, 476 and the bore portion 470 form a configuration which is somewhat U-shaped in cross section. The carriage assembly 426 also includes a bearing arrangement 478 including two sets of roller bearings 480 which are disposed between the plates 474, 476 adjacent the ends thereof opposite the base portion 470 and which are rotatably held between the plates 474, 476 with bolts 482 (and cooperating nuts 484) whose shanks extend through either of the two aligned acts of through-openings 486 provided within the plates 474, 476.

As is the case with the carriage assembly 26 of the apparatus support 21 of FIGS. 1 and 3-13, the carriage assembly 426 of the apparatus supports 421 of FIGS. 18-20 includes an arbor assembly 66 having a tubular member 30 which is rotatably connected to the plates 474, 476 by way of a bearing assembly 68 secured (e.g. welded) within aligned openings 488 provided in the plates 474, 476. The tubular member 30 has a free end 70 which extends to one side of the carriage assembly 426 and which is adapted to be accepted endwise by the hollow bore 42 (FIG. 2) of an item 18.

As best shown in FIGS. 19 and 20, the apparatus support 421 includes a telescoping post assembly 440 having two opposite ends 442, 444 wherein one end 442 is joined (e.g. welded or pinned to the ring 22 adjacent the location to which one end 28 (FIG. 18) of the strut 24 is joined to the ring 22; and the mechanical means 428 includes a screw jack assembly 446 which is interposed between the carriage assembly 226 and the ring 22 to facilitate the movement of the carriage assembly 226 along the length of the midsection 60 of the strut 24 between the first and second locations therealong.

With reference again to FIG. 19, the elongated telescoping post assembly 440 includes a hollow inner tube section 448 (which provides the end 442 of the post assembly 440) and a hollow outer tube section 448 (which provides the opposite end 444 of the assembly 440), and at least a portion of the inner tube section 448 is accepted by the hollow interior of the outer tube section 450 through an open end thereof. The inner and outer tube sections 448 and 450 are sized to permit the tube sections 448 and 450 to telescopically move relative to one another and thereby permit the spaced distance between the ends 442, 444 of the tube assembly 440 to be altered. Within the depicted apparatus support 421, each of the inner and outer tube sections 448 and 450 are comprised of steel tubing having a substantially square cross section.

The jack assembly 446 is adapted to telescopically move the outer and inner tube sections 448 and 450 relative to one another to thereby alter the distance between the post assembly ends 442 and 444. More specifically, the screw jack assembly 446 enables a user to mechanically move the opposite ends 442 and 444 of the post assembly 440 toward and away from one another. As best shown in FIG. 19, the screw jack assembly 446 includes a rotatable screw 452 which is rotatably mounted within the interior of the outer tube section 450 by way of a bearing member 454 mounted adjacent the upper end, as viewed in FIG. 19, of the outer tube section 450 and an internally-threaded nut, or collar member 456, is fixedly secured within the interior of the inner tube section 448 adjacent the upper end thereof. With the screw 452 threadably accepted by the collar member 456, rotation of the screw 452 in one rotational direction along the length of the outer tube section 450 forcibly moves the opposite ends 442 and 444 of the post assembly 440 away from one another, and rotation of the screw 452 in the opposite rotational direction along the length of the outer tube section 450 forcibly moves the opposite ends 442 and 444 of the post assembly 440 toward one another.

To facilitate the manual manipulation, or rotation, of the screw 452 by a user, there is provided a handle 458 which is joined at one end of the screw 452 (i.e. adjacent the end 444 of the elongated post assembly 440). By grasping the grip, indicated 460, of the handle 458 and then rotating the handle 458 about the bearing member 454, the screw 452 is forced to rotate about its longitudinal axis. Preferably, the handle 458 is pivotally connected to the screw 452 to facilitate the folding, or collapsing, of the handle 456 against the outer tube section 450 for storage purposes.

With reference still to FIGS. 19 and 20, the carriage assembly 426 is connectable to the outer tube section 450 of the telescoping post assembly 440 so that movement of the outer tube section 450 relative to and along the length of the inner tube section 448 also effects the movement of the carriage assembly 426 along the length of the strut 24. In this connection, there is attached to one side of the outer tube section 450 an elongated bar 462 having a plurality of through-openings 464 along the length of the bar 462, and there is associated with the carriage assembly 426 a retractable pin assembly 466 having a pin 468 whose end 469 is movable between an extended position, as illustrated in solid lines in FIG. 20, and a retracted position, as illustrated in phantom in FIG. 20.

The bar 462 is affixed (e.g. welded) along one side of the outer tube section 450 so as to extend therealong and so that the side surface, indicated 490, of the outer tube section 450 backs the through-openings 464 of the bar 462 and thereby provides, with the through-openings 464, a plurality of recesses 492 (FIG. 20) along the length of the bar 462. Meanwhile, the plate 474 of the carriage assembly 426 defines an opening 494 therein, and the pin assembly 466 includes a cylindrical housing 496 having an end which is affixed (e.g. welded) to the plate 474 about the opening 494. The pin 468 and a spring 498 are mounted within the housing 496 to act between the housing 496 and the pin 468 to bias the pin end 469 from the FIG. 20 retracted (phantom-line) position relative to the housing 496 toward the FIG. 20 extended (solid-line) position relative to the housing 496.

It therefore follows that the pin end 469 can be manually retracted from a recess 492 provided along the bar 462 (by manually pulling the head end of the pin 468 away from the surface 490 of the outer tube section 450) to permit the body of the carriage assembly 426 to be moved (by way of the bearing arrangement 478) along the length of the strut 24, and the release of the head end of the pin 468 permits the pin end 469 to return toward its FIG. 20 extended condition under the influence of the spring 498. Therefore and during use of the apparatus support 421, the pin end 469 can be manually withdrawn from one of the recesses 492 to permit the carriage assembly 426 to be manually moved along the length of the strut 24 to a desired location (e.g. a first location) therealong at which the pin 468 is aligned with an alternative recess 492 so that by releasing the head end of the pin 468, the pin end 469 moves into and is accepted by the alternative recess 492. With the pin 468 thereby accepted by the alternative recess 492, the carriage assembly 426 is locked in position along the length of the outer tube section 450 so that movement of the opposite ends 442, 444 of the telescoping post assembly 440 toward and away from one another by way of the jack assembly 446 forcibly moves the carriage assembly 426 along the length of the strut 24 between, for example, a first location therealong and a second, or target, location therealong.

To prepare the apparatus support 221 for lifting an item 18 from the floor 16, the jack assembly 446 is manipulated, by way of the handle 458, to move the outer tube section 450 to a lowered condition (as viewed in FIG. 19) along the length of the inner tube section 448. The support 221 is thereafter positioned adjacent one end of the item 18 to be lifted by the support 221, and the carriage assembly 426 is moved, as necessary, to an appropriate location (i.e. the first location) along the length of the strut 24 (by withdrawing the pin 468 from one recess 492 and manually shifting the carriage assembly 426 along the length of the strut 24 until the longitudinal axis of the tubular member 30 of the carriage assembly 426 is substantially axially aligned with the hollow bore 42 disposed at one end of the barrel 36 of the item 18 (when the item 18 rests upon the floor 16 as is depicted in FIG. 2). The pin 498 is then released so that the pin end 469 is accepted by the recess 492 situated closest to the position assumed by the carriage assembly 426 when the assembly 426 is disposed in its (i.e. first) location along the length of the strut 24 (i.e. the position of the carriage assembly 426 along the strut 24 at which the tubular member 30 of the assembly 426 is substantially aligned with the hollow bore 42 of the item 18), and the support 221 is thereafter manipulated relative to the item 18 so that the tubular member 30 is fully accepted endwise by the hollow bore 42 of the item 18.

Once the tubular member 30 is fully accepted by the hollow bore 42, the handle 458 of the jack assembly 446 is appropriately manipulated (i.e. rotated) so that the opposite ends 442, 444 of the post assembly 440 are moved further apart and so that the carriage assembly 426 (which is locked in position along the length of the outer tube section 450 by way of the pin 468), as well as the tubular member 30, are forcibly urged from the first location along the strut 24 toward the second location therealong. This forced movement of the tubular member 30 along the strut 24 to the second location therealong forcibly moves, or shifts, the barrel 36 of the item 18 so that its longitudinal axis is moved into substantial axial alignment with the geometric center of the ring 22 and so that the rim 41 (FIG. 2) of the item 18 being raised by the support 221 is thereby lifted from the underlying floor 16. When the carriage assembly 426 has been moved along the strut 24 and into abutting relationship with the stop flange 100 (FIG. 18)—thereby indicating to a user that the carriage assembly 226 has reached its second, or target, location along the strut 24), the user ceases his rotation of the handle 458 of the jack assembly 446. If desired, a pin (not shown) can be inserted and secured through an opening 500 (FIG. 18) provided in the strut 24 adjacent the side of the carriage assembly 426 opposite the flange 100 to enhance the securement of the carriage assembly 426 in its second location along the strut 24.

With the rim 41 of the flange 38 or 40 associated with the end of the item 18 thereby maintained in a spaced relationship with the floor 16 by way of the support 421, the item 18 can be manipulated, or pivoted about the other, or floor-engaging, rim 41 of the other item flange 40 or 38 as the apparatus support 421 is manipulated, or rolled, along the floor 16.

In order to lift the other, or floor-engaging, rim 41 of the FIG. 2 item 18 from the floor 16 (so that the rims 41 of both flanges 38, 40 are elevated from the floor 16), an additional support (not shown) of identical construction to that of the apparatus support 421 can be manipulated into position alongside the floor-engaging end of the item 18 so that the cooperating member of its carriage assembly is positioned into cooperating relationship with the bore 42 of the floor-engaging end of the item 18. The handle of the jack assembly of the support is thereafter appropriately rotated to move the carriage assembly along the strut of the additional support to the second location therealong. With two supports 421 of the apparatus 420 thereby supporting the item 18 above the floor 16 by way of the cooperating members 30 of the carriage assemblies 426 of the supports 421, the item 18 can remain in an elevated, stationary condition for the purpose of winding material 32 about the barrel 36 of the item 18 or unwinding material 32 from the barrel 36 of the item 18 as the item 18 is free to rotate about its longitudinal axis by way of the bearing assemblies 68 (FIG. 19) associated with the tubular members 30.

It follows from the foregoing that a ring apparatus 20, 220, 320 or 420 having at least one support 21, 221, 321 or 421, respectively, and an associated method of use has been described for lifting and supporting an item 18 for holding windable material in an elevated condition above a floor 16. The support 21, 221, 321 or 421 of the ring apparatus 20, 220, 320 or 420 includes a ring 22 having an outer diameter which is greater than the height of the flanges 38, 40 of the item 18 desired to be lifted with the support and has an interior. A strut, such as strut 24, is joined to the ring 22 and which includes an elongated section 60 having a length which spans at least a portion of the interior of the ring 22. In addition, a carriage assembly 26, 226, 326 or 426 is mounted upon the elongated section of the strut 24 for movement along the length thereof between first and second locations therealong and which includes a cooperating member 30, 230 or 330 which is cooperable with the barrel 36 of the item 18 at one of the two opposite ends of the item 18 so that when the item 18 is supported by the support, at least a portion of the weight of the item 18 is borne by the cooperating member 30, 230 or 330 of the carriage assembly.

When the carriage assembly is positioned at the first location along the elongated section of the strut 24, the cooperating member 30, 230 or 330 of the carriage assembly can be positioned in cooperating relationship with the barrel 36 of the item 18 at one end thereof, and when the carriage assembly is positioned at the second location along the elongated section of the strut 24 and the item 18 is supported at one of its ends by way of the cooperating member 30, 230 or 330, the longitudinal axis of the barrel 36 is substantially aligned with the geometric center of the ring 22. Upon positioning the apparatus support 21, 221, 321 or 421 adjacent one flange 38 or 40 of the item 18 at one of the two opposite ends of the barrel 36 while the carriage assembly is positioned in its first location along the length of the elongated section of the strut 24, the cooperating member 30, 230 or 330 of the carriage assembly can be positioned in cooperating relationship with the barrel 36 of the item 18 at one end thereof. With the cooperating member 30, 230 or 330 of the carriage assembly thus positioned in cooperating relationship with the barrel 36 of the item 18, the movement of the carriage assembly along the length of the strut 24 can be effected so that the rim 41 of the one flange 38 or 40 disposed at the one end of the item 18 is lifted from the floor 16.

The method of the invention includes the step of providing the apparatus support 21, 221 or 321 of the invention and then positioning the apparatus support 21, 221 or 321 adjacent one flange 38 or 40 of the item 18 at one of the two opposite ends thereof while the carriage assembly is disposed at the first location therealong. By positioning the cooperating member 30, 230 or 330 of the carriage assembly in cooperating relationship with the barrel 36 of the item 18 and then effecting the movement of the carriage assembly along the length of the elongated section of the strut 24 to the second location therealong, the rim 41 of the one flange 38 or 40 disposed at the one end of the item 18 is lifted from the floor 16.

It will be understood that numerous modifications and substitutions can be had to the aforedescribed embodiments without departing from the spirit of the invention. For example, although the carriage assembly 326 of the apparatus support embodiment 321 of FIGS. 15-17 has been shown and described as being capable of being locked in position along the interior surface of a barrel 36 of an item 18 to thereby affix the carriage assembly 326, and the associated apparatus support 321 to the barrel 36, the principles of the carriage assembly 326 can also be employed to secure the carriage assembly 326 to the inside surface of a tube which is positioned through the barrel 36 of the item 18.

Figure 21:
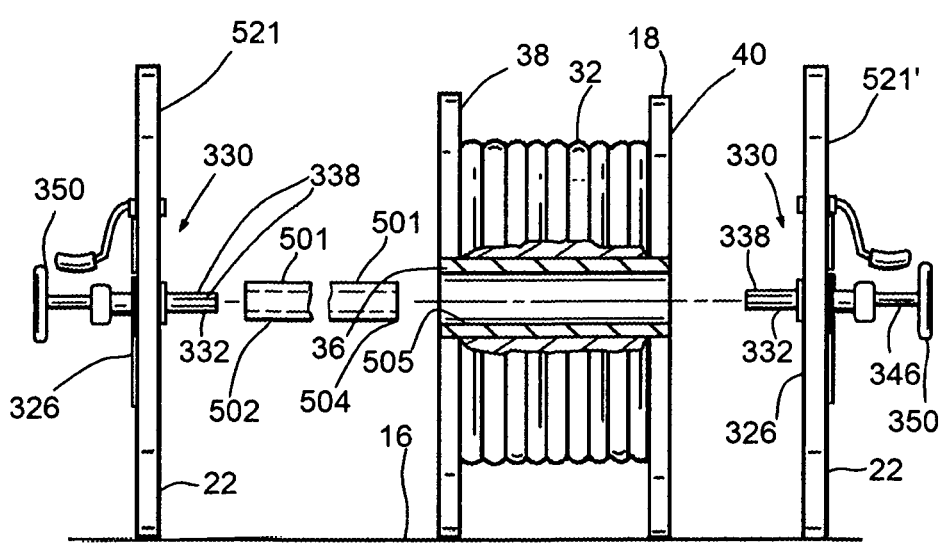
FIG. 21 is an end view, shown partially in section, of an apparatus comprised of a pair of supports which each embody the carriage assembly of FIGS. 15-17 shown being utilized to support a spool above a floor by way of a hollow tube, or pipe, which extends through the barrel of the spool, shown exploded.
Figure 22:
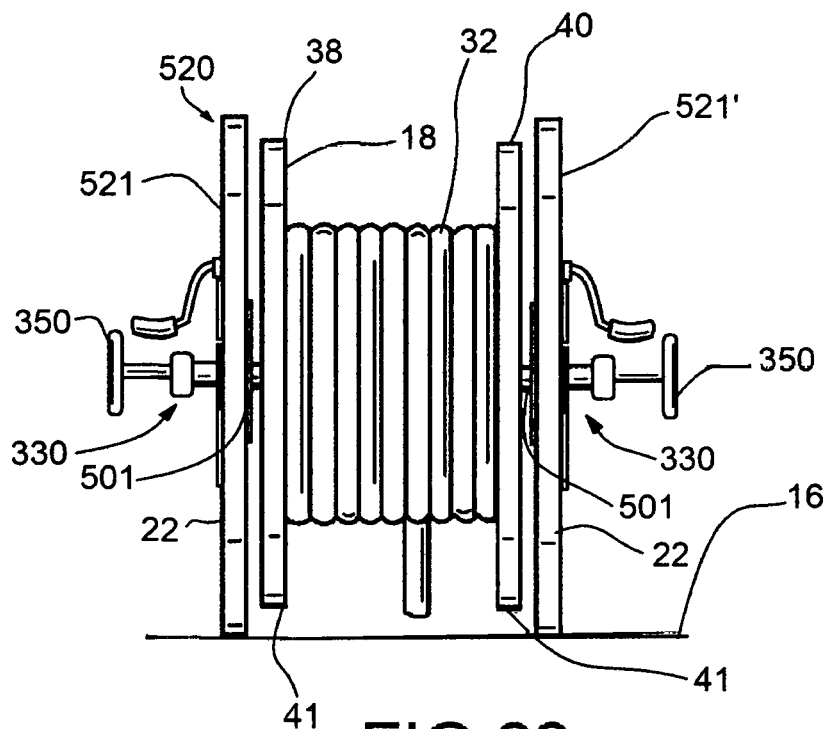
FIG. 22 is an end elevation view of the apparatus supports of FIG. 21 shown supporting the spool of FIG. 21 in an elevated condition above the floor.

For example, there is illustrated in FIG. 21 an item 18 having a barrel 36 through which a hollow tube 501 extends so that each of its opposite ends, indicated 502, 504 in FIG. 21, are accessible at the opposite ends of the barrel 36. Meanwhile, there is also shown in FIG. 21 an alternative apparatus 520 having a pair of supports 521, 521' having carriage assemblies 326 (having a cooperating member 330 and axially-extending sections 338) and wherein each carriage assembly 326 is identical in construction to the carriage assembly 326 (and its components 330 and 338) of the apparatus support 321 of FIGS. 15-17 and accordingly bear the same reference numerals. However and whereas the carriage assembly 326 of the apparatus support 321 of FIGS. 15-17 have been shown and described to releasably lock the apparatus support 321 to the item 18 as the axially-extending sections 338 of the cooperating member 332 are expanded outwardly against the interior surfaces 42 (FIG. 17) of the barrel 36 of the item 18, the axially-extending sections 338 of the cooperating member 330 of the carriage assemblies 326 of the apparatus supports 521, 521' of FIG. 21 are expandable can be expanded against the interior surfaces 505 (FIG. 21) of the tube 501 to thereby releasably lock the carriage assemblies 326 of the supports 521, 521' (and the supports 521, 521' associated with the carriage assemblies 326) to the tube 501. With the apparatus supports 521, 521' thereby supporting the item 18 above the floor 16, as illustrated in FIG. 22, by way of the tube 501 which extends through the barrel 36 of the item 18, the item 18 can remain in a stationary condition for the purpose of winding material 32 about the barrel 36 of the item 18 or unwinding material 32 from the barrel 36 of the item 18 as the item 18 is free to rotate about its longitudinal axis by way of the bearing assemblies 336 (FIG. 15) associated with the cooperating members 330 of FIG. 21.

Furthermore and although the cooperating members of the carriage assemblies of the apparatus embodiments of FIGS. 1 and 3-22 have been shown and described as including tubular members capable of being inserted endwise into the hollow barrel 36 of an item 18 (or within the interior of a tube 501 which extends through the barrel 36 of an item 18), the cooperating members of an apparatus support which embodies features of the present invention can cooperate with, so as to support in a cradling fashion, protuberances which extend from the opposite ends of the item. For example, there is depicted in FIG. 23 an item 618 having a centrally-disposed barrel 636 about which a windable material 32 Is wound and from which cylindrical protuberances 540 extend at each of the opposite ends of the barrel 536, and there is provided an apparatus support 621 having a carriage assembly 626 which includes a cooperating member 630 which is positionable in cooperating relationship with one of the protuberances 640 of the item 618. To this end, the carriage assembly 626 includes a pair of plates 646, 648 which are rotatably mounted upon a strut 24 for movement along the length thereof between first and second locations therealong.

In addition, the pair of plates 646, 648 define aligned, semi-circular-shaped cutouts 650, 652, respectively, and there is associated with the cooperating member 630 a pair of spaced-apart rollers 654 which extend between the plates 646, 648 adjacent the cutouts 650, 652 thereof so that the peripheral surfaces of the rollers 654 extend above, as viewed in FIG. 23, the upper edges of the cutouts 650, 652. When the protuberance 640 of the item 618 is directed sideways into the cutouts 650, 652 so as to rest across the peripheral surfaces of the rollers 654, the protuberance 640 is cradled by the cooperating member 630. By thereafter positioning a tension assembly 660 (including a chain link arrangement of rollers 666 extending therealong) across the cradled protuberance 640 and securing each end of the tension assembly 660 to the plates 646, 648 on opposite sides of the protuberance 640, the protuberance 640 is thereby secured within the cutouts 650, 652 and is free to rotate about its longitudinal axis by way of the rollers 654 and 662 between which the protuberance 540 is captured. It follows that the step of maneuvering the cooperating member 630 into cooperating relationship with a protuberance 640 associated with an end of the item 18 involves the positioning of the protuberance 640 into a nested relationship with the cutouts 650, 652 of the plates 646, 648.

Further still and although the carriage assembly 326 of the support embodiment 321 of FIGS. 15-17 has been shown an described as including an elongated, expandable cooperating member 332 having a free end 334 which is movable between a collapsed (FIG. 16) condition and an expanded (FIG. 17) condition for releasably securing the carriage assembly 326 to the interior surfaces of a hollow item, such as the interior surfaces of the barrel 36 of the FIG. 2 spool or the interior surfaces of the tube 501 of FIG. 21, an alternative carriage assembly can possess a cooperating member having two ends which are movable in unison between a collapsed condition and an expanded condition.

Figure 26:
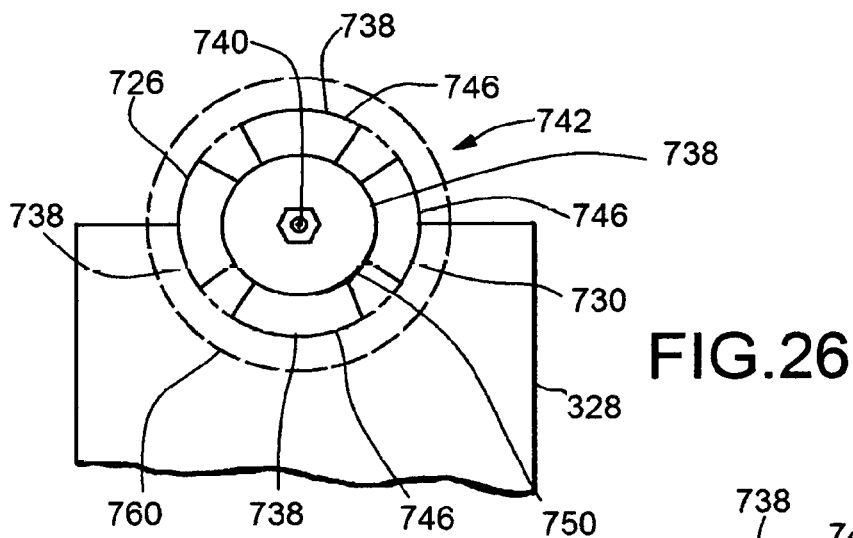
FIG. 26 is a side view, like that of FIG. 25, of the fragment of the carriage assembly of FIG. 24 but showing the cooperating member of the carriage assembly when positioned in an expanded condition.
Figure 25:
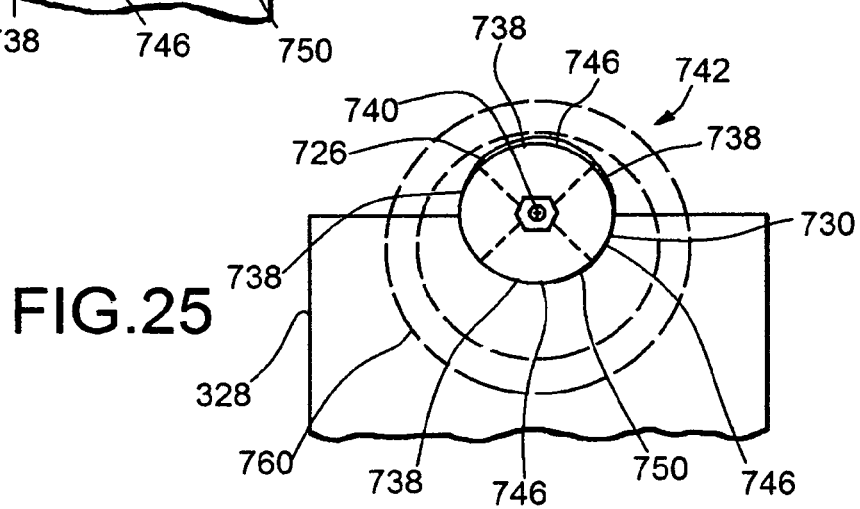
FIG. 25 is a side view of a fragment of the carriage assembly of FIG. 24 as seen generally from the right in FIG. 24 and showing the cooperating member of the carriage assembly when positioned in a collapsed condition.
Figure 24:
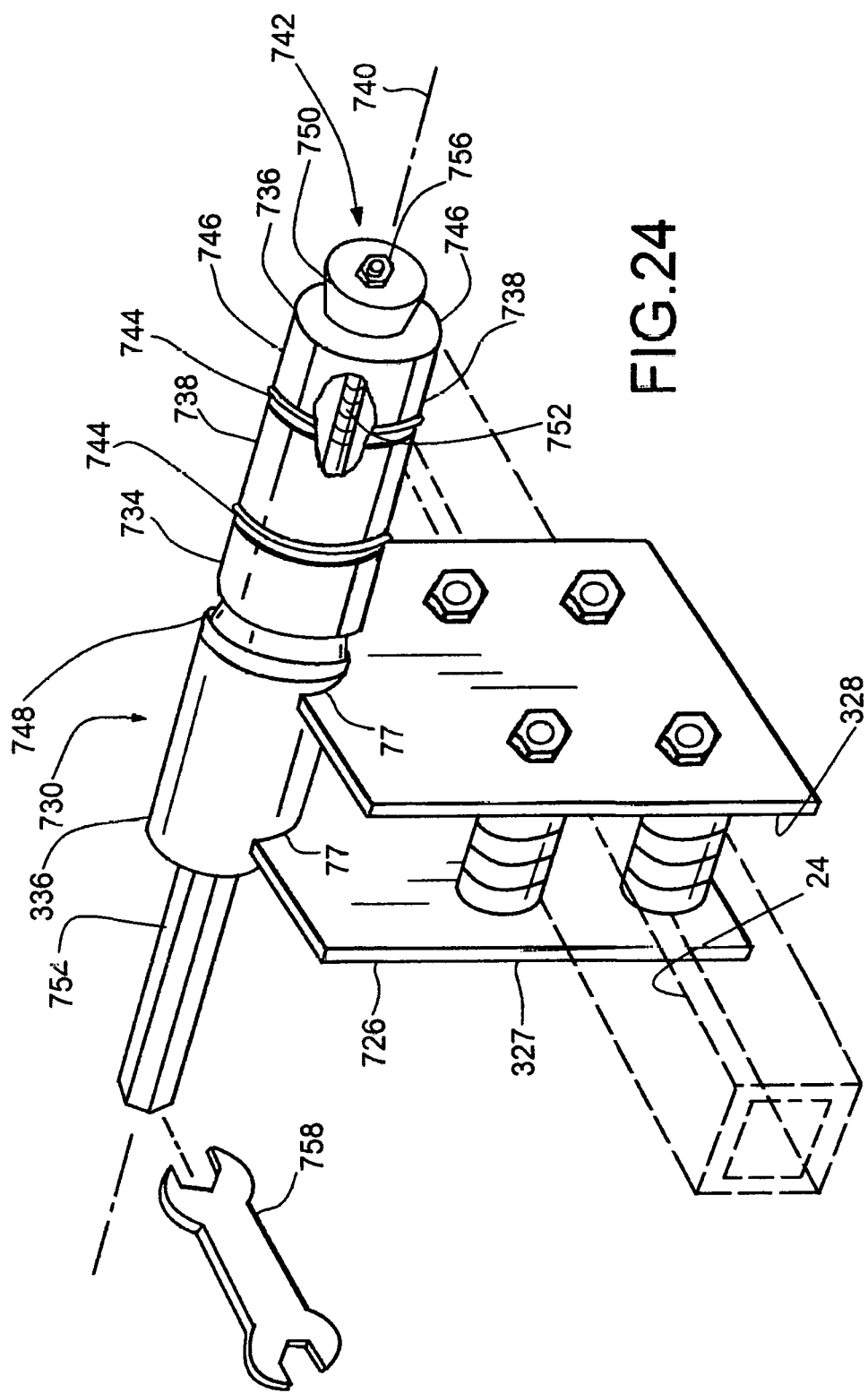
FIG. 24 is a perspective view, similar to that of FIG. 15 but shown partially cut-away, of another exemplary carriage assembly for an apparatus support whose cooperating member is capable of being affixed within the hollow interior of an object, such as the barrel of the item of FIG. 2 or the tube of FIG. 21.

For example, there is FIGS. 24-26 an exemplary carriage assembly 726 of a support embodiment 721 having an elongated, expandable cooperating member 730 having two opposite ends 734, 736 which are capable of being moved in unison radially inwardly or outwardly relative to the longitudinal axis, indicated 740, of the cooperating member 730. Other components of the carriage assembly 726 which are identical to those of the carriage assembly embodiment 326 of FIG. 15 accordingly bear the same reference numerals. Briefly, the cooperating member 730 includes a plurality of (e.g. four) wedge-shaped sectors 738 which are positioned about the longitudinal axis 740 and held together in a grouped arrangement, generally indicated 742, with a pair of elastic bands 744 which encircle the arrangement 742. These sectors 738 include outer surfaces 746 which are directed radially outwardly of the longitudinal axis 740 and which collectively provide the outer, substantially cylindrically-shaped periphery of the cooperating member 730.

In addition, a pair of conically-shaped bodies 748, 750 are positioned at the opposite ends 734, 736 of the cooperating member 730 wherein one conical body 748 is affixed in position adjacent the member end 734, while the other conical body 750 is positioned adjacent the other member end 736. A threaded shank 752 (which is integrally joined in axial alignment with an actuator rod 752 which, in turn, is rotatably mounted within the sleeve member 336) extends axially through the center of the member 730 and the first and second conical bodies 748, 750 and is threadably accepted by a nut 756 positioned about the end of the shank 752 opposite the member end 734. By rotating the threaded shank 754 (by way of the actuator rod 754 and a wrench 758) in one rotational direction about the longitudinal axis 740, the conical bodies 748, 750 are forced to move closer together along the threaded shank 752 so that the wedge-shaped sectors are urged outwardly from, for example, the collapsed condition illustrated in FIG. 25 to the expanded condition, illustrated in FIG. 26 so that the outer diameter of the arrangement 742 is increased. By rotating the threaded shank 754 in the opposite rotational direction about the axis 740, the conical bodies 748, 750 are moved further apart so that the sectors 738 are permitted to return, under the influence of the elastic bands 744, from, for example, the FIG. 6 expanded condition toward the FIG. 25 collapsed condition.

It therefore follows that upon positioning the cooperating member 730 (when disposed in its FIG. 25 collapsed condition) within the interior of a hollow item, such as a tube 760 (depicted in phantom in FIGS. 25 and 26) and then the actuator rod 754 is appropriately rotated to expand the cooperating member 730 toward its FIG. 26 expanded condition until the outer periphery of the cooperating member 730 is tightly pressed against the interior surfaces of the tube 760. With the cooperating member 730 thereby tightly pressed against the interior surfaces of the tube 760, the carriage assembly 726 is releasably locked to the tube 760.

Accordingly, the aforedescribed embodiments are intended for the purpose of illustration and not as limitation.

The invention claimed is:

1. An apparatus for lifting an item for holding windable material wherein the item includes an elongated barrel having two opposite ends and about which the material is wound or from which the material can be unwound and two flanges wherein the flanges are disposed at the two opposite ends of the barrel and wherein each of the two flanges has a rim along the periphery thereof and the item is arranged so that the rims of both flanges engage an underlying floor and the barrel of the item is oriented substantially parallel to the floor, and the flanges of the item have a height as measured from the floor, said apparatus comprising:
    a ring having an outer diameter which is greater than the height of the flanges of the item desired to be lifted with the apparatus and having an interior;
    a strut which is joined to the ring and includes an elongated section having a length which spans at least a portion of the interior of the ring and
    a carriage assembly which is mounted upon and surrounds the elongated section of the strut for movement along the length thereof and which includes a cooperating member which is cooperable with the barrel of the item at one of the two opposite ends of the barrel so that when the item is supported by the apparatus, at least a portion of the weight of the item is borne by the cooperating member of the carriage assembly, and wherein the carriage assembly is movable along the elongated section of the strut from a first location along the elongated section at which the cooperating member of the carriage assembly can be positioned in cooperating relationship with the barrel of the item when the apparatus is positioned adjacent a flange of the item at one of the two opposite ends of the barrel to a second location along the elongated section so that when the carriage assembly is positioned at said second location and the item is supported at one end of the barrel of the item by way of the cooperating member, the longitudinal axis of the barrel is substantially aligned with the geometric center of the ring
    so that by positioning the apparatus adjacent one flange of the item at one of the two opposite ends of the barrel while the carriage assembly is positioned in its first location along the length of the elongated section of the strut, positioning the cooperating member of the carriage assembly in cooperating relationship with the barrel of the item, and then effecting the movement of the carriage assembly along the length of the elongated section of the strut to the second location therealong, the rim of the one flange of the item is lifted from the floor.

2. The apparatus as defined in claim 1 further including means for moving the carriage assembly from the first location along the elongated section of the strut to the second location therealong.

3. The apparatus as defined in claim 1 further including a jack assembly which is adapted to act between the ring and the carriage assembly for moving the carriage assembly from the first location to the second location.

4. The apparatus as defined in claim 3 further including an elongated telescoping post assembly having two opposite ends, an inner tube section which provides one end of the two opposite ends of the post assembly and is affixed in position with respect to the ring and an outer tube section which provides the other end of the two opposite ends of the post assembly, and the post assembly is arranged within the ring in a substantially parallel relationship with the elongated section of the strut and wherein the outer tube section is movable relative to the inner tube section to alter the spaced distance between the two opposite ends of the telescoping post assembly;
    the carriage assembly is connected to the outer tube section of the tube telescoping post assembly for movement therewith as the outer tube section is moved relative to the inner tube section to alter the spaced distance between the two opposite ends of the telescoping post assembly; and
    means for moving the outer tube section of the telescoping post assembly relative to the inner tube section to alter the spaced distance between the two opposite ends of the post assembly
    so that after positioning the apparatus adjacent one flange of the item at one of the two opposite ends of the barrel while the carriage assembly is positioned in its first location along the length of the elongated section of the strut and positioning the cooperating member of the carriage assembly in cooperating relationship with the barrel of the item, the carriage assembly can be moved along the length of the elongated section of the strut to the second location by way of the means for moving to lift the rim of the one flange of the item from the floor.

5. The apparatus as defined in claim 4 wherein the jack apparatus is interposed between the inner and outer tube sections of the telescoping post assembly for moving the outer tube section relative to the inner tube section as aforesaid.

6. The apparatus as defined in claim 4 further including means for releasably securing the carriage assembly to the outer tube section at alternative locations along the length of the outer tube section.

7. The apparatus as defined in claim 6 wherein the outer tube section has a side member along which a series of indentations are defined, the carriage assembly includes a pin which is mounted for movement into and out of an indentation of the series of indentations to either secure the carriage assembly to the outer tube section of the post assembly or release the carriage assembly from the outer tube section to accommodate the movement of the carriage assembly along the length of the outer tube section for securement of the carriage assembly to the outer tube section of the post assembly at an alternative location therealong.

8. The apparatus as defined in claim 7 wherein the carriage assembly includes means for biasing the pin into the indentation as aforesaid.

9. An apparatus for lifting an item for holding windable material wherein the item includes an elongated, centrally-disposed barrel having two opposite ends and about which the material is wound or from which the material can be unwound and two flanges wherein the flanges are disposed at the two opposite ends of the barrel and wherein each of the two flanges has a rim along the periphery thereof and the item is arranged so that the rims of both flanges engage an underlying floor and the barrel of the item is oriented substantially parallel to the floor, and the flanges of the item has a height as measured from the floor, said apparatus comprising:

a ring having an outer diameter which is greater than the height of the flanges of the item desired to be lifted with the apparatus and having an interior;

a strut which is joined to the ring and includes an elongated section having a length which spans at least a portion of the interior of the ring and a carriage assembly which is mounted upon and surrounds the elongated section of the strut for movement along the length thereof between first and second locations therealong and which includes a cooperating member which is cooperable with the barrel of the item at one of the two opposite ends of the barrel so that when the item is supported by the apparatus, at least a portion of the weight of the item is borne by the cooperating member of the carriage assembly, and so that when the carriage assembly is positioned at said first location along the elongated section of the strut, the cooperating member of the carriage assembly can be positioned in cooperating relationship with the barrel of the item and so that when the carriage assembly is positioned at said second location along the elongated section of the strut and the item is supported at one end of the barrel of the item by way of the cooperating member, the longitudinal axis of the barrel is substantially aligned with the geometric center of the ring so that by positioning the apparatus adjacent one flange of the item at one of the two opposite ends of the barrel while the carriage assembly is positioned in its first location along the length of the elongated section of the strut, positioning the cooperating member of the carriage assembly in cooperating relationship with the barrel of the item, and then effecting the movement of the carriage assembly along the length of the elongated section of the strut to the second location therealong so that the one of the two opposite ends of the barrel of the item is lifted to about the geometric center of the ring, the rim of the one flange of the item is lifted from the floor.

10. The apparatus as defined in claim 9 wherein the carriage assembly has a body and the apparatus further includes an arrangement of rollers which are interposed between the body of the carriage assembly and the elongated section of the strut so that as the carriage assembly is moved along the length of the elongated section of the strut between the first and second locations therealong, the movement of the body of the carriage assembly along the length of the elongated section is facilitated by the arrangement of rollers.

11. The apparatus as defined in claim 10 wherein the carriage assembly includes a pair of plates which are positioned on opposite sides of the elongated section of the strut, and the arrangement of rollers are rotatably mounted between the pair of plates for rotation with respect thereto and have surfaces which engage the elongated section of the strut so that as the carriage assembly is moved along the length of the elongated section of the strut between the first and second locations therealong, the body of the carriage assembly moves along the length of the elongated section as the surfaces of the rollers move in rolling engagement with the elongated section of the strut.

12. The apparatus as defined in claim 11 wherein the arrangement of rollers includes two sets of rollers which are arranged for rotation about substantially parallel axes and wherein one set of rollers is arranged along one side of the elongated section of the strut and the other set of rollers is arranged on the side of the elongated section of the strut opposite said one side of the elongated section of the strut so that the elongated section of the strut is captured between the first and second sets of rollers.

13. The apparatus as defined in claim 9 further comprising means for limiting the movement of the carriage assembly along the length of the elongated section of the strut from the first location therealong to the position assumed by the carriage assembly when the carriage assembly is positioned at the second location along the length of the elongated section of the strut.

14. The apparatus as defined in claim 9 further comprising means for limiting the movement of the carriage assembly along the length of the elongated section of the strut through a range of movement extending between the position assumed by the carriage assembly when the carriage assembly is positioned at the first location along the length of the elongated section of the strut and the position assumed by the carriage assembly when the carriage assembly is positioned at the second location along the length of the elongated section of the strut.

15. The apparatus as defined in claim 9 wherein the barrel of the item includes an opening which is disposed substantially centrally of the one flange, the ring has a radial plane, the carriage assembly has a body, and the cooperating member includes a rotatable component which is mounted upon the body of the carriage member for rotation relative to the body about an axis which is substantially normal to the radial plane of the ring and wherein the rotatable component is adapted to be accepted by the opening of the barrel of the item when the rotatable component is directed therein so that upon acceptance of the rotatable component by the opening disposed substantially centrally of the one flange, the carriage assembly is positioned in cooperating relationship with the barrel of the item at the one of the two opposite ends of the barrel.

16. The apparatus as defined in claim 15 further includes means for releasably securing the rotatable component within the opening of the barrel of the item when the rotatable component is accepted thereby.

17. The apparatus as defined in claim 16 wherein the opening of the barrel of the item has interior surfaces which extend between the two opposite ends of the barrel and wherein the rotatable component includes an elongated assembly having peripheral sections which are movable radially inwardly or outwardly relative to the longitudinal axis of the elongated assembly for movement of the peripheral sections into and out of engagement with the interior surfaces of the opening of the barrel of the item, and the means for releasably securing includes means for moving the peripheral sections of the elongated assembly radially inwardly or outwardly as aforesaid.

18. The apparatus as defined in claim 9 wherein there is associated with the item a hollow tube having two opposite ends and which extends through the barrel so that its two opposite end portions protrude axially of the barrel at the two opposite ends thereof, and wherein the ring has a radial plane, the carriage assembly has a body, and the cooperating member includes a rotatable component which is mounted upon the body of the carriage member for rotation relative to the body about an axis which is substantially normal to the radial plane of the ring and wherein the rotatable component is adapted to be accepted by a hollow end portion of the tube which protrudes axially of the barrel at one end thereof when the rotatable component is directed therein so that upon acceptance of the rotatable component by the hollow end portion of the tube, the carriage assembly is positioned in cooperating relationship with the barrel of the item at the one of the two opposite ends of the barrel.

19. The apparatus as defined in claim 18 further includes means for releasably securing the rotatable component within the hollow end portion of the tube when the rotatable component is accepted thereby.

20. The apparatus as defined in claim 9 wherein the strut has a portion which is joined to the ring along one sector of the ring and another portion which is joined to the ring along another sector of the ring, and wherein the one and another sectors of the ring are substantially diametrically opposed from one another.

21. The apparatus as defined in claim 9 further including a jack assembly for acting between the strut and the carriage assembly to thereby effect the movement of the carriage assembly along the length of the elongated section of the strut from the first location to the second location.

22. The apparatus as defined in claim 9 wherein there is associated with the elongated barrel of the item a protuberance member which protrudes substantially axially from each of the two opposite ends of the barrel and with which the item can be lifted from the underlying floor, and wherein the carriage assembly includes a bracket which is adapted to accept a protuberance member associated with one end of the two opposite ends of the barrel of the item so that when the cooperating member is positioned in cooperating relationship with an end of the two opposite ends of the barrel, the bracket acts as a cradle within which the protuberance member is accepted.

23. An apparatus for lifting an item for holding windable material wherein the item includes an elongated barrel having two opposite ends and about which the material is wound or from which the material can be unwound and two flanges wherein the flanges are disposed at the two opposite ends of the barrel and wherein each of the two flanges has a rim along the periphery thereof and the item is arranged so that the rims of both flanges engage an underlying floor and the barrel of the item is oriented substantially parallel to the floor, and the flanges of the item has a height as measured from the floor, said apparatus comprising:

a ring having an outer diameter which is greater than the height of the flanges of the item desired to be lifted with the apparatus and having an interior;

a strut which is joined to the ring and includes an elongated section having a length which spans at least a portion of the interior of the ring and a carriage assembly which is mounted upon the elongated section of the strut for movement along the length thereof and which includes a cooperating member which is cooperable with the barrel of the item at one of the two opposite ends of the barrel so that when the item is supported by the apparatus, at least a portion of the weight of the item is borne by the cooperating member of the carriage assembly, and wherein the carriage assembly is movable along the elongated section of the strut from a first location along the elongated section at which the cooperating member of the carriage can be placed in cooperating relationship with the barrel of the item when the apparatus is positioned adjacent a flange of the item at one of the two opposite ends of the barrel to a second location along the elongated section so that when the carriage assembly is positioned at said second location and the item is supported at one end of the barrel of the item by way of the cooperating member, the longitudinal axis of the barrel is substantially aligned with the geometric center of the ring;

an elongated telescoping post assembly having two opposite ends, an inner tube section which provides one end of the two opposite ends of the post assembly and an outer tube section which provides the other end of the two opposite ends of the post assembly and is connected to the ring for support of the post assembly in a substantially parallel relationship with the elongated section of the strut and wherein the inner and outer tube sections are movable relative to one another to alter the spaced distance between the two opposite ends of the telescoping post assembly;

the carriage assembly is connected to outer tube section of the telescoping post assembly for movement therewith as the inner and outer tube sections are moved relative to one another to alter the spaced distance between the opposite ends of the telescoping post assembly; and means for moving the inner and outer tube sections of the telescoping post assembly relative to one another to thereby alter the spaced distance between the two opposite ends of the post assembly so that by positioning the apparatus adjacent one flange of the item at one of the two opposite ends of the barrel while the carriage assembly is positioned in its first location along the length of the elongated section of the strut, positioning the cooperating member of the carriage assembly in cooperating relationship with the barrel of the item, and then moving the inner and outer tube sections relative to one another by way of the means for moving to alter the spaced distance between the opposite ends of the telescoping post assembly to thereby move the carriage assembly along the length of the elongated section of the strut to the second location therealong, the rim of the one flange of the item is lifted from the floor.

24. The apparatus as defined in claim 23 further including means for releasably securing the carriage assembly to the outer tube section at alternative locations along the length of the outer tube section.

25. The apparatus as defined in claim 24 wherein the means for releasably securing includes a pin-including arrangement for securing the carriage assembly in a fixed relationship to the outer tube section along the length thereof.

26. The apparatus as defined in claim 23 wherein the means for moving includes a jack assembly which is interposed between the inner and outer tube sections for moving the inner and outer tube sections relative to one another as aforesaid.

27. An apparatus for lifting an item for holding windable material wherein the item includes an elongated barrel having two opposite ends and about which the material is wound or from which the material can be unwound and two flanges wherein the flanges are disposed at the two opposite ends of the barrel and wherein each of the two flanges has a rim along the periphery thereof and the item is arranged so that the rims of both flanges engage an underlying floor and the barrel of the item is oriented substantially parallel to the floor, and the flanges of the item has a height as measured from the floor, said apparatus comprising:
a pair of supports wherein each support includes
(a) a ring having an outer diameter which is greater than the height of the flanges of the item desired to be lifted with the apparatus and having an interior;
(b) a strut which is joined to the ring and includes an elongated section having a length which spans at least a portion of the interior of the ring and
(c) a carriage assembly which is mounted upon and surrounds the elongated section of the strut for movement along the length thereof and which includes a cooperating member which is cooperable with the barrel of the item at one of the two opposite ends of the barrel so that when the item is supported by the apparatus, at least a portion of the weight of the item is borne by the cooperating member of the carriage assembly, and wherein the carriage assembly is movable along the elongated section of the strut from a first location along the elongated section at which the cooperating member of the carriage can be positioned in cooperating relationship with the barrel of the item when the apparatus is positioned adjacent a flange of the item at one of the two opposite ends of the barrel to a second location along the elongated section so that when the carriage assembly is positioned at said second location and the item is supported at one end of the barrel of the item by way of the cooperating member, the longitudinal axis of the barrel is substantially aligned with the geometric center of the ring so that by positioning each of the pair of supports adjacent a corresponding flange of the item at the two opposite ends of the barrel while the carriage assembly of each support is positioned in the first location along the length of the elongated section of the strut, positioning the cooperating member of the carriage assembly of each support in cooperating relationship with the barrel of the item, and then, for each support, effecting the movement of the carriage assembly along the length of the elongated section of the strut to the second location therealong, the rims of the flanges of the item are lifted from the floor.

28. A method for lifting an item for holding windable material from an underlying floor wherein the item includes an elongated barrel having two opposite ends and about which the material is wound or from which the material can be unwound and two flanges wherein the flanges are disposed at the two opposite ends of the barrel and wherein each of the two flanges has a rim along the periphery thereof and the item is arranged so that the rims of both flanges engage an underlying floor and the barrel of the item is oriented substantially parallel to the floor, and the flanges of the item have a height as measured from the floor, the method comprising the steps of:

providing an apparatus including
(a) a ring having an outer diameter which is greater than the height of the flanges of the item desired to be lifted with the apparatus and having an interior;
(b) a strut which is joined to the ring and includes an elongated section having a length which spans at least a portion of the interior of the ring; and
(c) a carriage assembly which is mounted upon and surrounds the elongated section of the strut for movement along the length thereof and which includes a cooperating member which is cooperable with the barrel of the item at one of the two opposite ends of the barrel so that when the item is supported by the apparatus, at least a portion of the weight of the item is borne by the cooperating member of the carriage assembly, and wherein the carriage assembly is movable along the elongated section of the strut from a first location along the elongated section at which the cooperating member of the carriage assembly can be positioned in cooperating relationship with the barrel of the item when the apparatus is positioned adjacent a flange of the item at one of the two opposite ends of the barrel to a second location along the elongated section so that when the carriage assembly is positioned at said second location and the item is supported at one end of the barrel of the item by way of the cooperating member, the longitudinal axis of the barrel is substantially aligned with the geometric center of the ring;
positioning the apparatus adjacent one flange of the item at one end of the two opposite ends of the barrel;
positioning the cooperating member of the carriage assembly in cooperating relationship with the barrel of the item; and then
effecting the movement of the carriage assembly along the length of the elongated section of the strut to the second location therealong so that the rim of the one flange of the item is lifted from the floor.

29. The method as defined in claim 28 wherein the step of effecting is carried out by rolling the ring across the floor in first and second stages of movement wherein the first stage of movement effects a lifting of the carriage assembly to an elevation above the floor which is higher than the position assumed by the carriage assembly when the carriage assembly is disposed in its second location along the elongated section of the strut and wherein the second stage of movement effects the movement of the carriage assembly along the elongated section of the strut to the second location under the gravitational influence of the weight of the item borne by the cooperating member of the carriage assembly.

30. The method as defined in claim 28 wherein the step of effecting in carried out with a jack assembly.

* * * * *